United States Patent
Eguchi et al.

(10) Patent No.: US 8,019,803 B2
(45) Date of Patent: *Sep. 13, 2011

(54) METHOD AND DEVICE FOR RESTORING DEGRADED INFORMATION

(75) Inventors: Mitsuo Eguchi, Saitama (JP); Tetsuhiko Yoshida, Nagoya (JP)

(73) Assignees: Lightron Co., Ltd., Saitama-shi (JP); Lightron International Co., Ltd., Saitama-shi (JP)

( * ) Notice: Subject to any disclaimer, the term of this patent is extended or adjusted under 35 U.S.C. 154(b) by 1190 days.

This patent is subject to a terminal disclaimer.

(21) Appl. No.: 11/664,990

(22) PCT Filed: Oct. 13, 2005

(86) PCT No.: PCT/JP2005/018866
§ 371 (c)(1),
(2), (4) Date: Apr. 10, 2007

(87) PCT Pub. No.: WO2006/041127
PCT Pub. Date: Apr. 20, 2006

(65) Prior Publication Data
US 2009/0013020 A1    Jan. 8, 2009

(30) Foreign Application Priority Data
Oct. 14, 2004  (JP) .................................. 2004-300206

(51) Int. Cl.
*G06F 17/10* (2006.01)
(52) U.S. Cl. ...................................................... 708/300
(58) Field of Classification Search ........... 708/300–409
See application file for complete search history.

(56) References Cited

U.S. PATENT DOCUMENTS

| | | | |
|---|---|---|---|
| 5,414,782 A * | 5/1995 | Carasso | 382/270 |
| 6,154,574 A * | 11/2000 | Paik et al. | 382/255 |
| 6,200,266 B1 * | 3/2001 | Shokrollahi et al. | 600/438 |
| 6,485,423 B2 * | 11/2002 | Angelsen et al. | 600/458 |

(Continued)

FOREIGN PATENT DOCUMENTS

JP    A-07-334668    12/1995

(Continued)

OTHER PUBLICATIONS

Jan. 28, 2010 Office Action issued in European Patent Application No. 05 793 661.9.

(Continued)

*Primary Examiner* — David H Malzahn
(74) *Attorney, Agent, or Firm* — Oliff & Berridge, PLC

(57) ABSTRACT

The present invention provides a technology which can perform a precise restoration to a distribution of original information by carrying out an iterative calculation using only a distribution of degraded information. The method according to the present invention performs the restoration to original information based only on degraded information. The method according to the present invention considers the distribution of the degraded information and the distribution of the original information as distributions of probability density functions, and considers a transfer function of a transfer system as a probability density function of a conditional probability. The most probable estimations of the distribution of the original information with respect to the distribution of the degraded information and the most probable estimations of the distribution of the transfer function are alternately carried out to finally restore the original information by means of the iterative calculation based on the Bayes' theorem for probability density functions.

4 Claims, 12 Drawing Sheets

U.S. PATENT DOCUMENTS 7,260,270 B2 * 8/2007 Kusaka .................. 382/275
7,444,014 B2 10/2008 Dresser et al.

FOREIGN PATENT DOCUMENTS

| | | |
|---|---|---|
| JP | A 11-258057 | 9/1999 |
| JP | A 2000-123168 | 4/2000 |
| JP | A 2004-186901 | 7/2004 |
| WO | WO 2004/075107 A2 | 9/2004 |
| WO | WO 2006/041126 A1 | 4/2006 |

OTHER PUBLICATIONS

Van Kempen et al., "A quantitative comparison of image restoration method for confocal microscopy," Journal of Microscopy, Mar. 1, 1997, pp. 354-365, vol. 185, Pt. 3, Wiley-Blackwell Publishing Ltd, Great Britain.

O'Sullivan et al., "Information-Theoretic Image Formation," IEEE Transactions on Information Theory, Oct. 1, 1998, pp. 2094-2123, vol. 44, No. 6, IEEE, U.S.A.

Al-Bakkar et al, "A Parallel Implementation of a Modified Richardson-Lucy Algorithm for Image De-Blurring," International Journal of Infrared and Millimeter Waves, vol. 18, No. 3, pp. 555-575, Mar. 1997.

Faulkner et al, "Computational Aberration Determination and Correction," Optics Communications, vol. 216, No. 1-3, pp. 89-98, Feb. 2003.

Eguchi et al., U.S. Appl. No. 11/665,011, filed Apr. 10, 2007.

William Hadley Richardson, "Bayesian-Based Iterative Method of Image Restoration," Journal of the Optical Society of America, vol. 62, No. 1, pp. 55-59, Jan. 1972.

L. B. Lucy, "An Iterative Technique for the Rectification of Observed Distributions," The Astronomical Journal, vol. 79, No. 6, pp. 745-754, Jun. 1974.

Apr. 27, 2010 Office Action issued in Japanese Patent Application No. 2006-540968 (with English translation).

Korean Patent Office, *Korean Office Action for Korean Patent Application No. 2007-7010929* (with English translation), mailed Jul. 8, 2010, pp. 1-9 (pp. 1-4 for translation).

Jul. 21, 2010 Office Action for US. Appl. No. 11/665,011.

Hadar et al., *Restoration of Images Degraded by Extreme Mechanical Vibrations,* Optics & Laser Technology, 1997, vol. 29, No. 4, pp. 171-177; Elsevier Science Ltd., Great Britain.

* cited by examiner

METHOD AND DEVICE FOR RESTORING DEGRADED INFORMATION

TECHNICAL FIELD

The present invention relates to the restoration of degraded information. More particularly, the present invention relates to a method and a device for the restoration of information to the original information based on information degraded as a result of transfer.

BACKGROUND ART

There is demand for a means of precisely estimating original information using information degraded by transfer. In this case, estimation by means of a transfer function for a transfer system is generally used. If the transfer function of the transfer system is known, and the transfer function takes non-zero value for the entire frequency domain of the original information, it is possible to completely restore the original information from the information obtained after the transfer by means of an inverse filter of the transfer function.

Restoration by means of the above method cannot be directly applied to a case where the transfer function takes a value of zero in certain frequency domain. This is because the inverse filter cannot be defined in the frequency domain where the transfer function takes a value of zero. Thus, the information in the frequency domain where the transfer function takes a value of zero is lost in the course of the transfer in this transfer system. In other words, when information is transferred, the information is not transferred as the exact original; instead it is degraded in the course of the transfer. If an image is transferred in an optical system, for example, the image is degraded resulting in the loss of fine and detailed portions, namely portions with high spatial frequencies, due to aberrations and errors in the devices, and the image is recognized in the degraded state.

There have been technologies proposed to restore degraded information due to losses in specific frequency domains in the course of transfer based on the transfer characteristics of a transfer system and the information after degradation. The technologies for restoring degraded information have been proposed mainly in the field of image processing. Regarding the technology for restoring a degraded image, there is a known method that employs the Richardson-Lucy algorithm, described in W. H. Richardson, "Bayesian-based iterative method of image restoration", Journal of Optical Society of America, United States, 1972, volume 62, pp 55-59, and L. B. Lucy, "An iterative technique for the rectification of observed distributions", Astronomical Journal, United States, 1974, volume 79, pp 745-754.

The method employing the Richardson-Lucy algorithm recognizes the formation of light in an image as one event, and restores the original image by means of a method used in a technical field of probability and statistics. The method employing the Richardson-Lucy algorithm normalizes a distribution of illuminance for an original image to recognize the distribution as the distribution of a probability density function for an event of image formation of light on the original image. Moreover, the method normalizes a distribution of illuminance for a degraded image to recognize the distribution as the distribution of a probability density function for an event of image formation of light on the degraded image. A point spread function (PSF), which is a transfer characteristic of an optical system, can be recognized as the distribution of a probability density function of a conditional probability, which represents the distribution of the probability that light forms an image on the degraded image based upon the condition that a point of light forms an image on the original image. The method employing the Richardson-Lucy algorithm estimates, using an iterative calculation, the most probable distribution of distributions for the original image that will realize the distribution of the degraded image based on the distribution of the degraded image and the distribution of the PSF according to the Bayes' theorem. The distribution of the PSF may be calculated from the parameters of the optical system or may be calculated by experimentally acquiring a distribution of an image by actually transferring a point image.

Though the method employing the Richardson-Lucy algorithm is a method to restore a degraded image, the same method may be used to restore original information from degraded information for other types of information such as the history of an electric potential.

DISCLOSURE OF THE INVENTION

Problems to be Solved by the Invention

It is possible to employ the Richardson-Lucy algorithm to restore a degraded image fairly well. Even if an original image includes characters, and the characters are degraded to the extent of being illegible on the degraded image, the characters can be restored to such a degree that one can manage to recognize them on an original image estimated according to the Richardson-Lucy algorithm.

It is necessary to precisely evaluate the transfer characteristics of the optical system to restore the degraded image to the original image as described above. Estimation based on the transfer characteristics of the optical system is carried out in the process of the restoration of the original image, and using imprecisely evaluated transfer characteristics for the optical system thus results in an imprecisely estimated original image. It is essential to precisely evaluate the transfer characteristics of the optical system in order to restore the degraded image to the original image.

However, there may be a case where the precise evaluation of the transfer characteristics of an optical system is difficult. The transfer characteristics of the optical system are calculated by parameters such as the numerical aperture of a lens, the illumination wavelength, the degree of aberration, and the degree of defocus. If some of these parameters are unknown or imprecisely determined, the transfer characteristics calculated for the optical system will be imprecise as a result. If the transfer characteristics of the optical system are imprecise, it is not possible to perform a precise restoration to an original image according to the conventional image restoration method described above. It is thus necessary to precisely evaluate the transfer characteristics of the optical system prior to the original image restoration.

Moreover, there is a case where the transfer characteristics of an optical system are completely unknown, and it is thus necessary to perform restoration to an original image solely based on a degraded image. In this case, conventional image restoration method described above is unusable, and there is no way of performing original image restoration.

The present invention solves the above problem. The present invention provides a technology which can precisely estimate transfer characteristics of a transfer system by carrying out an iterative calculation based on a distribution of degraded information and a distribution of original information.

Moreover, the present invention provides a technology which can precisely estimate both the transfer characteristics of a transfer system and a distribution of original information by carrying out an iterative calculation based only on a distribution of degraded information.

Means for Solving the Problems

A method according to present invention estimates a distribution of a frequency response of a transfer system based on original information and degraded information. This method includes a step of identifying a distribution of the degraded information, a step of identifying a spectrum distribution of a distribution of the original information, and a step of identifying an initial estimated distribution of an impulse response of the transfer system. Moreover, the method includes, as a single cycle, the steps of (1) acquiring a first function by applying a Fourier transform to the estimated distribution of the impulse response, (2) acquiring a second function by multiplying the first function by the spectrum distribution of the distribution of the original information, (3) acquiring a third function by applying an inverse Fourier transform to the second function, (4) acquiring a fourth function by dividing the distribution of the degraded information by the third function, (5) acquiring a fifth function by applying a Fourier transform to the fourth function, (6) acquiring a sixth function by multiplying the fifth function by an inverse function of the spectrum distribution of the distribution of the original information, (7) acquiring a seventh function by applying an inverse Fourier transform to the sixth function, and (8) acquiring a next estimated distribution of the impulse response by multiplying the estimated distribution of the impulse response by the seventh function. Furthermore, the method includes a step of replacing the estimated distribution of the impulse response by the next estimated distribution of the impulse response acquired in the step (8), and repeating the steps (1) to (8), and a step of applying a Fourier transform to the estimated distribution of the impulse response to acquire and output the distribution of the frequency response of the transfer system.

The impulse response described herein represents the distribution of the degraded information when the distribution of the original information is given by a unit impulse function. When the information handled is an image, the impulse response refers to a distribution of a PSF.

The frequency response described herein represents the ratio of the spectrum distribution of the distribution of the degraded information to the spectrum distribution of the distribution of the original information. When the information handled is an image, the frequency response refers to a distribution of an OTF (optical transfer function).

Though the information handled by the method according to the present invention is not limited to images, and the present invention may be applied to the history of an electric signal, for example, a description of a principle of the method according to the present invention will be given for a case where the information handled is an image.

First, a description will be given of a restoration method for an image based on the Bayes' theorem in order to describe the method according to the present invention. A description will be given of a case where a black and white original image is transferred via a certain optical system, and a black and white degraded image is formed. In the following section, it is assumed that the sizes of the original image and the degraded image are the same, a point on the images can be represented as a coordinate (x,y), and the illuminance distribution of the original image and the illuminance distribution of the degraded image are respectively represented as $f_r(x,y)$ and $g_r(x,y)$.

By applying a two-dimensional Fourier transform to the distributions $f_r(x,y)$ and $g_r(x,y)$ of the images, the spectrum of a spatial frequency s corresponding to x and a spatial frequency t corresponding to y are acquired.

[Equation 1]

$$F_r(s,t)=FT(f_r(x,y))(s,t)=\int_{-\infty}^{\infty}\int_{-\infty}^{\infty}f_r(x,y)e^{j(sx+ty)}dxdy \quad (1)$$

[Equation 2]

$$G_r(s,t)=FT(g_r(x,y))(s,t)=\int_{-\infty}^{\infty}\int_{-\infty}^{\infty}g_r(x,y)e^{j(sx+ty)}dxdy \quad (2)$$

The OTF refers to the following complex function $H_r(s,t)$ where $F_r(s,t)$ is the spatial spectrum of the distribution $f_r(x,y)$ of the original image and $G_r(s,t)$ is the spatial spectrum of the distribution $g_r(x,y)$ of the degraded image.

[Equation 3]

$$G_r(s,t)=F_r(s,t)\cdot H_r(s,t) \quad (3)$$

For a general optical system, it is possible to acquire the distribution $g_r(x,y)$ of the degraded image by means of $H_r(s,t)$, which is an OTF determined by the optical system and imaging conditions, for the distribution $f_r(x,y)$ of any original image.

The OTF, which is a complex function, is represented by a modulation transfer function (MTF) $M_r(s,t)$, which represents the magnitude of the complex amplitude, and a phase transfer function (PTF) $P_r(s,t)$, which represents the phase shift, as:

[Equation 4]

$$H_r(s,t)=M_r(s,t)e^{jP_r(s,t)} \quad (4)$$

It is possible to precisely evaluate the characteristic relating to the phase of the optical system by means of the OTF. The OTF can be calculated from characteristic parameters of the optical system.

The method according to the present invention handles the distribution of the original image and the distribution of the degraded image as probability density functions, and estimates the original image based on the Bayes' theorem. The distribution $f_r(x,y)$ of the original image and the distribution $g_r(x,y)$ of the degraded image as specified above can be treated as probability density functions by the following normalization.

[Equation 5]

$$f(x,y)=\frac{f_r(x,y)}{\int_{-\infty}^{\infty}f_r(x,y)dxdy} \quad (5)$$

[Equation 6]

$$g(x,y)=\frac{g_r(x,y)}{\int_{-\infty}^{\infty}g_r(x,y)dxdy} \quad (6)$$

In correspondence to the above normalization, the optical transfer function $H_r(s,t)$ is also normalized. The optical transfer function $H_r(s,t)$ is normalized based on a value at a point where the spatial frequency is 0 (zero).

[Equation 7]

$$H(s,t)=\frac{H_r(s,t)}{H_r(0,0)} \quad (7)$$

The normalized distribution $f(x,y)$ of the original image and the normalized distribution $g(x,y)$ of the degraded image are non-negative functions, have the integral of 1 within a defined area, and thus can be treated as probability density functions. In the above case, the distribution f(x, y) represents a probability density function of an event in which an image is formed at a coordinate (x,y) on the original image. Moreover, the distribution g(x, y) represents a probability density function of an event in which an image is formed at a coordinate (x,y) on the degraded image.

If the distributions of the original image and the degraded image can be considered as probability distribution functions, it is possible to estimate the distribution of the original image, from which the degraded image was generated, from the distribution of the degraded image based on the Bayes' theorem.

If an event, in which a point light source is present at a coordinate $(x_1, y_1)$ on the original image, is denoted as $V(x_1, y_1)$, and an event in which a point image is formed at a coordinate $(x_2, y_2)$ on the degraded image is $A(x_2,y_2)$, probabilities P(V) and P(A) of the respective events are represented as:

[Equation 8]

$$P(V(x_1,y_1))=f(x_1,y_1) \tag{8}$$

[Equation 9]

$$P(A(x_2,y_2))=g(x_2,y_2) \tag{9}$$

Moreover, the probability that an image is formed at the coordinate $(x_2, y_2)$ on the degraded image if a point light source is present at the coordinate $(x_1, y_1)$ on the original image is an occurrence probability of the event $A(x_2,y_2)$ under the condition of the occurrence of the event $V(x_1, y_1)$. This probability is represented by h(x,y), which is a PSF of the optical system, as:

[Equation 10]

$$P(A(x_2,y_2)|V(x_1,y_1))=h(x_2-x_1,y_2-y_1) \tag{10}$$

The distribution of the original image $P(V(x,y)|A(x_2,y_2))$, which forms a point image at the point $(x_2,y_2)$ on the degraded image, is estimated based on the Bayes' theorem by:

[Equation 11]

$$P(V(x,y)|A(x_2,y_2)) = \frac{p(V(x,y))p(A(x_2,y_2)|V(x,y))}{p(A(x_2,y_2))} \tag{11}$$

$$= \frac{p(V(x,y))p(A(x_2,y_2)|V(x,y))}{\int_{-\infty}^{\infty}\int_{-\infty}^{\infty} p(V(x_1,y_1))}$$

$$p(A(x_2,y_2)|V(x_1,y_1))dx_1\,dy_1$$

The following equation is obtained by respectively assigning equation (8) and equation (10) to P(V(x,y)) and $P(A(x_2,y_2)|V(x,y))$ on the right side of the above equation.

[Equation 12]

$$P(V(x,y)|A(x_2,y_2)) = \frac{f(x,y)h(x_2-x,y_2-y)}{\int_{-\infty}^{\infty}\int_{-\infty}^{\infty} h(x_2-x_1,y_2-y_1)} \tag{12}$$

$$f(x_1,y_1)dx_1\,dy_1$$

The left side of the above equation represents an estimated distribution of the original image if a point image is formed on the degraded image. It is possible to obtain the distribution f(x, y) of the original image which realizes the distribution g(x, y) of the degraded image by multiplying the above equation by the distribution g(x,y) of the degraded image, and then integrating the resulting equation.

The following equation is obtained by multiplying the both sides of the above equation by $P(A(X_2,y_2))=g(x_2,y_2)$, and carrying out an integration for all $(x_2,y_2)$.

[Equation 13]

$$\int_{-\infty}^{\infty} P(V(x,y)|A(x_2,y_2))g(x_2,y_2)dx_2\,dy_2 = \tag{13}$$

$$f(x,y)\int_{-\infty}^{\infty} \frac{h(x_2-x,y_2-y)g(x_2,y_2)}{\int_{-\infty}^{\infty} h(x_2-x_1,y_2-y_1)f(x_1,y_1)dx_1\,dy_1}$$

If equation (9) is assigned to the left side of the above equation, the integration results in P(V(x,y)), which is equal to f(x,y). As a result, the following relationship holds based on the Bayes' theorem.

[Equation 14]

$$f(x,y) = f(x,y)\int_{-\infty}^{\infty} \frac{h(x_2-x,y_2-y)g(x_2,y_2)}{\int_{-\infty}^{\infty} h(x_2-x_1,y_2-y_1)} dx_2\,dy_2 \tag{14}$$

$$f(x_1,y_1)dx_1\,dy_1$$

The above relationship is considered to hold if the distribution f(x,y) is a true distribution of the original image. In other words, calculating the distribution f(x,y) which satisfies the above equation corresponds to the restoration of the degraded image.

The distribution f(x,y), which satisfies the above relationship, can be calculated by carrying out an iterative calculation for a distribution $f_k(x,y)$, in which the distribution f(x,y) on the right side of equation (14) is set to the distribution $f_k(x,y)$, and the distribution f(x,y) on the left side of equation (14) is set to a distribution $f_{k+1}(x,y)$, and a converged value of the distribution $f_k(x,y)$ is acquired. The converged value of the distribution $f_k(x,y)$ obtained by the iterative calculation corresponds to an estimated distribution of the original image based on the Bayes' theorem.

Though a description has been given of the case where the distribution f(x,y) of the original image and the distribution g(x,y) of the degraded image are normalized, these distributions may be directly used without normalization for the actual iterative calculation.

For the iterative calculation, an initial estimated distribution $f_0(x,y)$ of the original image is set before the iterative calculation. An arbitrary distribution may be set as the initial estimated distribution $f_0(x,y)$. In general, since the distribution g(x,y) of the degraded image is not largely different from the distribution f(x,y) of the original image, the distribution g(x,y) of the degraded image is preferably used as the initial estimated distribution $f_0(x,y)$.

The right side of equation (14) includes a convolution using a distribution h(x,y), which is the PSF. In general, it is difficult to precisely evaluate a PSF that includes the phase characteristic of an optical system, and it is thus difficult to carry out the iterative calculation including the precise phase characteristic. Since an iterative calculation using a PSF which does not include a precise phase characteristic results in a false convergence, it thus prevents an original image from being precisely restored.

It is thus possible to more precisely restore the original image by means of an OTF, which can more easily incorporate a precise phase characteristic, instead of the PSF. Moreover, in order to precisely evaluate the phase characteristic in the process of the restoration, the estimated distribution $f_k(x, y)$ ($k=0, 1, 2, \ldots$) of the original image is expanded into a complex function, and the real part thereof is considered to represent the image distribution. The form of the right side of the above equation can be changed using the OTF by applying a Fourier transform and an inverse Fourier transform. If the Fourier transform and the inverse Fourier transform are respectively denoted by $FT(\ )$ and $FT^{-1}(\ )$, equation (14) is represented as:

[Equation 15]

$$f_{k+1}(x, y) = f_k(x, y) \quad (15)$$

$$FT^{-1}\left(FT\left(\int_{-\infty}^{\infty} \frac{h(x_2 - x, y_2 - y)g(x_2, y_2)}{FT^{-1}\left(FT\left(\frac{\int_{-\infty}^{\infty} h(x_2 - x_1, y_2 - y_1)}{f_k(x_1, y_1)dx_1dy_1}\right)\right)}dx_2dy_2\right)\right) =$$

$$f_k(x, y)FT^{-1}\left(FT\left(\int_{-\infty}^{\infty} \frac{h(x_2 - x, y_2 - y)g(x_2, y_2)}{FT^{-1}(H(s, t) \cdot FT(f_k)(s, t))}dx_2dy_2\right)\right) =$$

$$(x_2, y_2)$$

$$f_k(x, y)FT^{-1}\left(FT\left(\frac{g}{FT^{-1}(FT(f_k) \cdot H)}\right)(s, t) \cdot H(-s, -t)\right)$$

It is possible to estimate the original image by repeating the iterative calculation until $f_k$ converges. It is possible to determine whether the distribution $f_k$ has converged or not by presetting the number of iterations, determining whether the set number has been reached, and then calculating the difference between the distributions $f_k$ and $f_{k+1}$ determining whether the total sum of the absolute value of the calculated differences is less than or equal to a certain threshold.

The restoration method employing the above principle can be embodied by sequentially executing the following steps. The distribution of the original image estimated by the iterative calculation is denoted by $f_k$ ($k=0, 1, \ldots$) in the following section. The estimated distribution $f_k$ of the original image is treated as a complex function in order to precisely evaluate the phase characteristic in the process of the restoration.

First, $H(s,t)$, which is an OTF, is identified based on the characteristics of the transfer system.

Then, as a first estimated distribution of the original image, the real part of the distribution $f_0(x,y)$ is set to the distribution $g(x,y)$, and the imaginary part of the distribution $f_0(x,y)$ is set to zero.

Then, the following calculation is repeated until the distribution $f_k(x,y)$ converges. On this occasion, $FT(\ )$ denotes a two-dimensional Fourier transform, and $FT^{-1}(\ )$ denotes a two-dimensional inverse Fourier transform. Moreover, $H^\#(s, t)$ denotes an inverse function of the function $H(s,t)$, and therefore $H^\#(s,t)=H(-s,-t)$ holds.

[Equation 16]

$$f_{k+1} = f_k \cdot FT^{-1}(FT(L) \cdot H^\#) \quad (16)$$

[Equation 17]

$$L = \frac{g}{FT^{-1}(FT(f_k) \cdot H)} \quad (17)$$

[Equation 18]

$$H^\#(s, t) = H(-s, -t) \quad (18)$$

The above iterative calculation is repeated, and a final estimated distribution $f_k$ of the original image is acquired. The real part of the final estimated distribution $f_k(x,y)$ of the original image acquired, corresponds to the restored image $f(x,y)$ of the original image.

The above method enables the iterative calculation by means of an OTF which takes into account of the precise phase characteristic as the transfer characteristic from an original image to a degraded image. It is thus considered that a more precise estimation is enabled compared to the case where the Richardson-Lucy algorithm is employed.

The above method can estimate an original image by means of only the Fourier transform, the inverse Fourier transform, and addition, subtraction, multiplication, and division operations without a convolution integral. As a result, it is possible to significantly reduce the time required for processing in comparison to a case where the Richardson-Lucy algorithm is employed.

It is possible to restore the unknown distribution of an original image based on the known distribution of the degraded image and the known distribution of the OTF. According to a principle similar to that described above, if a distribution of an OTF is unknown, it is possible to estimate the distribution of the OTF, based on the distribution of a degraded image and the distribution of an original image which are known.

The following equation is obtained by newly setting $x_2-x$ to $x'$, and $y_2-y$ to $y'$ in equation (12).

[Equation 19]

$$P(V(x_2 - x', y_2 - y') \mid A(x_2, y_2)) = \quad (19)$$

$$\frac{f(x_2 - x', y_2 - y')h(x', y')}{\int_{-\infty}^{\infty}\int_{-\infty}^{\infty} h(x_2 - x_1, y_2 - y_1)f(x_1, y_1)dx_1dy_1}$$

Both sides of the above equation are multiplied by $P(A(X_2, y_2))$.

[Equation 20]

$$P(V(x_2 - x', y_2 - y') \mid A(x_2, y_2))P(A(x_2, y_2)) = \quad (20)$$

$$\frac{f(x_2 - x', y_2 - y')h(x', y')}{\int_{-\infty}^{\infty}\int_{-\infty}^{\infty} h(x_2 - x_1, y_2 - y_1)f(x_1, y_1)dx_1dy_1}$$

The left side of the above equation is equal to $P(A(x_2,y_2) \mid V(x_2-x',y_2-y')) \times P(V(x_2-x',y_2-y'))$ according to the Bayes' theorem.

[Equation 21]

$$P(A(x_2, y_2) \mid V(x_2 - x', y_2 - y'))P(V(x_2 - x', y_2 - y')) = \quad (21)$$

$$\frac{f(x_2 - x', y_2 - y')h(x', y')}{\int_{-\infty}^{\infty}\int_{-\infty}^{\infty} h(x_2 - x_1, y_2 - y_1)f(x_1, y_1)dx_1dy_1}P(A(x_2, y_2))$$

Equations (8), (9), and (10) are assigned to the above equation.

[Equation 22]
$$h(x', y')f(x_2 - x', y_2 - y') = \frac{f(x_2 - x', y_2 - y')h(x', y')}{\int_{-\infty}^{\infty}\int_{-\infty}^{\infty} h(x_2 - x_1, y_2 - y_1) f(x_1, y_1) dx_1 dy_1} g(x_2, y_2) \quad (22)$$

Both sides of the above equation are integrated in terms of $(x_2, y_2)$.

[Equation 23]
$$h(x', y')\int_{-\infty}^{\infty}\int_{-\infty}^{\infty} f(x_2 - x', y_2 - y') dx_2 dy_2 = \quad (23)$$
$$h(x', y')\int_{-\infty}^{\infty}\int_{-\infty}^{\infty} \frac{g(x_2, y_2)f(x_2 - x', y_2 - y')}{\int_{-\infty}^{\infty}\int_{-\infty}^{\infty} h(x_2 - x_1, y_2 - y_1) f(x_1, y_1) dx_1 dy_1} dx_2 dy_2$$

Since the integral of the left side of the above equation is equal to 1, the following relationship holds according to the Bayes' theorem.

[Equation 24]
$$h(x, y) = h(x, y) \int_{-\infty}^{\infty}\int_{-\infty}^{\infty} \frac{g(x_2, y_2)f(x_2 - x, y_2 - y)}{\int_{-\infty}^{\infty}\int_{-\infty}^{\infty} h(x_2 - x_1, y_2 - y_1) f(x_1, y_1) dx_1 dy_1} dx_2 dy_2 \quad (24)$$

When a distribution $h(x,y)$, which satisfies the above equation, is calculated, it is possible to estimate a distribution $H(s,t)$ of the OTF by transforming the calculated distribution $h(x,y)$ by applying a Fourier transform.

The method according to the present invention sets the distribution $h(x,y)$ on the right side of equation (24) to a distribution $h_k(x,y)$, and sets the distribution $h(x,y)$ on the left side of equation (24) to a distribution $h_{k+1}(x,y)$, carries out iterative calculation for the distribution $h_k(x,y)$, and acquires a converged value of the distribution $h_k(x,y)$. It is possible to obtain an estimated distribution $H_k(x,y)$ of the OTF according to the Bayes' theorem by transforming the converged value of the distribution $h_k(x,y)$ obtained by the above iterative calculation by applying a Fourier transform.

[Equation 25]
$$h_{k+1}(x, y) = h_k(x, y) \quad (25)$$
$$FT^{-1}\left(FT\left(\int_{-\infty}^{\infty}\int_{-\infty}^{\infty} \frac{g(x_2, y_2)f(x_2 - x, y_2 - y)}{FT^{-1}\left(FT\left(\int_{-\infty}^{\infty}\int_{-\infty}^{\infty} h_k\binom{x_2 - x_1,}{y_2 - y_1}\right)\right) f(x_1, y_1) dx_1 dy_1} dx_2 dy_2\right)\right) =$$
$$h_k(x, y)$$
$$FT^{-1}\left(FT\left(\int_{-\infty}^{\infty}\int_{-\infty}^{\infty} \frac{g(x_2, y_2)f\binom{x_2 - x,}{y_2 - y}}{FT^{-1}\binom{FT(h_k(x, y))}{(s, t) \cdot F(s, t)}} dx_2 dy_2\right)\right) =$$
$$h_k(x, y) FT^{-1}\left(FT\left(\frac{g(x, y)}{FT^{-1}\binom{FT(h_k(x, y))}{(s, t) \cdot F(s, t)}}\right) \cdot F(-s, -t)\right)$$

[Equation 26]
$$H_k(s, t) = FT(h_k(x, y))(s, t) \quad (26)$$

The method for estimating an OTF that employs the principle above can be realized by sequentially executing the following steps. The distribution of the PSF estimated by the iterative calculation is denoted by the distribution $h_k$ ($k=0, 1, \ldots$) in the following section. The estimated distribution $h_k$ of the PSF is treated as a complex function in order to precisely evaluate the characteristic relating to the phase in the process of the iterative calculation.

First, the distribution $g(x,y)$ of the degraded image and the distribution $f(x,y)$ of the original image are identified. According to the method of the present invention, the real part of the distribution $g(x,y)$ is the distribution of the illuminance for the degraded image, and the imaginary part of the distribution $g(x,y)$ is 0 (zero). Moreover, the real part of the distribution $f(x,y)$ is the distribution of illuminance for the original image, and the imaginary part of the distribution $f(x,y)$ is 0 (zero).

Then, the distribution $f(x,y)$ of the original image is transformed by applying a Fourier transform in order to calculate the spectrum distribution $F(s,t)$ of the distribution of the original image.

Then, an initial estimated distribution $h_0(x,y)$ of the PSF is assigned. The initial estimated distribution $h_0(x,y)$ of the PSF may be an arbitrary distribution. For example, the real part and the imaginary part of the initial estimated distribution $h_0(x,y)$ of the PSF are respectively 1 and 0 (zero).

Then, the following calculation is repeated until the distribution $h_k(x,y)$ converges. On this occasion, $FT(\ )$ denotes a two-dimensional Fourier transform, and $FT^{-1}(\ )$ denotes a two-dimensional inverse Fourier transform. Moreover, a function $F^\#(s,t)$ denotes an inverse function of $F(s,t)$, and therefore $F^\#(s,t)=F(-s,-t)$ holds.

[Equation 27]
$$h_{k+1} = h_k \cdot FT^{-1}(FT(M) \cdot F^\#) \quad (27)$$

[Equation 28]
$$M = \frac{g}{FT^{-1}(FT(h_k) \cdot F)} \quad (28)$$

[Equation 29]
$$F^\#(s, t) = F(-s, -t) \quad (29)$$

Whether the distribution $h_k(x,y)$ has converged or not may be determined by determining whether the number of iterative calculations has reached a preset number, calculating the distribution of the difference between the distributions $h_k(x,y)$ and $h_{k+1}(x,y)$ and determining whether the absolute value of the difference is less than or equal to a certain threshold for all the coordinates $(x,y)$, or calculating the difference between the distributions $h_k$ and $h_{k+1}$, and determining whether the integral of the absolute value of the calculated difference for all the coordinates $(x,y)$ is less than or equal to a certain threshold.

If the distribution $h_k(x,y)$ has converged, the converged distribution $h_k(x,y)$ is transformed by applying a Fourier transform, and the estimated distribution $H_k(s,t)$ of the OTF is calculated.

It is possible to use the above method to properly estimate an OTF of a transfer system. According to the method of the present invention, even if the distribution of the original image does not include specific frequency bands, it is possible to estimate an OTF for all the frequency bands.

As described above, if a degraded image and an OTF are known, it is possible to restore the original image, and if a degraded image and an original image are known, it is possible to estimate an OTF.

By combining these methods, it is possible to estimate an OTF and restore an original image, based only on a degraded image.

Another method according to the present invention restores degraded information to original information. This method includes a step of identifying a distribution of the degraded information, a step of identifying an initial estimated distribution of the original information, a step of identifying an initial estimated distribution of an impulse response of a transfer system, (A) a step of updating the estimated distribution of the impulse response based on the distribution of the degraded information, the estimated distribution of the original information, and the estimated distribution of the impulse response, (B) a step of updating the estimated distribution of the original information based on the distribution of the degraded information, the estimated distribution of the original information, and the estimated distribution of the impulse response, a step of alternately repeating said steps (A) and (B), and a step of outputting the original information based on the estimated distribution of the original information.

In the above method, the step (A) of updating the estimated distribution of the impulse response comprises the steps of, (A1) acquiring a spectrum distribution of the estimated distribution of the original information by applying a Fourier transform to the estimated distribution of the original information, (A2) acquiring a first function by applying a Fourier transform to the estimated distribution of the impulse response, (A3) acquiring a second function by multiplying the first function by the spectrum distribution of the estimated distribution of the original information, (A4) acquiring a third function by applying an inverse Fourier transform to the second function, (A5) acquiring a fourth function by dividing the distribution of the degraded information by the third function, (A6) acquiring a fifth function by applying a Fourier transform to the fourth function, (A7) acquiring a sixth function by multiplying the fifth function by an inverse function of the spectrum distribution of the estimated distribution of the original information, (A8) acquiring a seventh function by applying an inverse Fourier transform to the sixth function, (A9) acquiring a next estimated distribution of the impulse response by multiplying the estimated distribution of the impulse response by the seventh function, and (A10) replacing the estimated distribution of the impulse response by the next estimated distribution of the impulse response.

In the above method, the step (B) of updating the estimated distribution of the original information comprises the steps of, (B1) acquiring an estimated distribution of a frequency response of the transfer system by applying a Fourier transform to the estimated distribution of the impulse response, (B2) acquiring a first function by applying a Fourier transform to the estimated distribution of the original information, (B3) acquiring a second function by multiplying the first function by the estimated distribution of the frequency response, (B4) acquiring a third function by applying an inverse Fourier transform to the second function, (B5) acquiring a fourth function by dividing the distribution of the degraded information by the third function, (B6) acquiring a fifth function by applying a Fourier transform to the fourth function, (B7) acquiring a sixth function by multiplying the fifth function by an inverse function of the estimated distribution of the frequency response, (B8) acquiring a seventh function by applying an inverse Fourier transform to the sixth function, (B9) acquiring a next estimated distribution of the original information by multiplying the estimated distribution of the original information by the seventh function, and (B10) replacing the estimated distribution of the original information by the next estimated distribution of the original information.

The above method initially hypothesizes proper distributions for both the original image and the PSF, and alternately repeats the estimation of the PSF (namely, the estimation of the OTF) and the estimation of the original image in order to restore the original image.

As for the OTF, it is possible to obtain a more improved estimated distribution by means of the calculation according to the Bayes' theorem using the distribution of the degraded image and the estimated distribution of the original image. The estimated distribution of the OTF is closer to the true distribution of the OTF when the estimated distribution of the original image, used for the estimation of the OTF, is closer to the true distribution of the original image.

For the original image, it is possible to obtain a more improved estimated distribution by means of the calculation according to the Bayes' theorem using the distribution of the degraded image and the estimated distribution of the OTF. The estimated distribution of the original image is closer to the true distribution of the original image when the estimated distribution of the OTF, used for the estimation of the original image, is closer to the true distribution of the OTF.

Thus, by alternately repeating the estimation of the OTF and the estimation of the original image, the estimated distribution of the original image becomes closer to the true distribution of the original image, and the estimated distribution of the OTF becomes closer to the true distribution of the OTF, resulting in both a properly restored original image and a properly estimated OTF.

The method according to the present invention can sequentially execute the following steps to perform restoration to an original image only from a degraded image.

First, the initial estimated distribution of the original image and the initial estimated distribution of the PSF are set. The initial estimated distribution of the original image may be any distribution. In general, the distribution of a degraded image is not largely different from the distribution of the original image, and the distribution of the degraded image is preferably used as the initial estimated distribution of the original image. The initial estimated distribution of the PSF may be any distribution.

Then, the calculations according to equations (27) to (29) are executed to obtain the improved estimated distribution $h_k(s,t)$ of the PSF, and the obtained distribution $h_k(s,t)$ is transformed by applying the Fourier transform to obtain the estimated distribution $H_k(s,t)$ of the OTF. It is possible to obtain an estimated distribution of the OTF closer to the true distribution of the OTF as a result of the above estimation.

Then, the calculations according to equations (16) to (18) are executed to obtain an improved estimated distribution $f_k(x,y)$ of the original image. It is possible to obtain an estimated distribution of the original image closer to the true distribution of the original image as a result of the above estimation.

By alternately repeating the estimation of the OTF and the estimation of the original image, the estimated distribution of the original image becomes closer to the true distribution of the original image, and the estimated distribution of the OTF becomes closer to the true distribution of the OTF. It is thus possible to carry out the above iterative calculation to restore the original image.

The inventors carried out the restoration of an original image according to the above method, and could properly perform the restoration of the original image using only the degraded image.

In the method for the restoration of degraded information, it is preferable that the step (A) of updating the estimated distribution of the impulse response repeats the execution of the steps (A2) to (A10), and that the step (B) of updating the estimated distribution of the original information repeats the execution of the steps (B2) to (B10).

It is possible to obtain a more probable estimated distribution of the impulse response by repeating the update of the estimated distribution of the impulse response. Moreover, it is possible to obtain a more probable estimated distribution of the original information by repeating the update of the estimated distribution of the original information. As described above, by repeating the process, and updating the estimated distribution, it is possible to execute the subsequent steps with a more probable estimated distribution, and as a result it is possible to reduce the number of the iterations of the iterative calculation required to restore the original information.

The frequency response estimation method and the degraded information restoration method can be implemented as programs which cause a computer to execute respective steps. FIG. 12 shows an example of a hardware configuration of the computer.

The above frequency response estimation method can be preferably carried out by the following device. FIG. 8 exemplifies a functional block diagram of a device 1000 according to the present invention. The device 1000 according to the present invention is a device which estimates a distribution of a frequency response of a transfer, system based on original information and degraded information. This device 1000 includes means 1002 for identifying a distribution of the degraded information, means 1004 for identifying a spectrum distribution of a distribution of the original information, means 1006 for identifying an initial estimated distribution of an impulse response of the transfer system, (1) means 1008 for acquiring a first function by applying a Fourier transform to the estimated distribution of the impulse response, (2) means 1010 for acquiring a second function by multiplying the first function by the spectrum distribution of the distribution of the original information, (3) means 1012 for acquiring a third function by applying an inverse Fourier transform to the second function, (4) means 1014 for acquiring a fourth function by dividing the distribution of the degraded information by the third function, (5) means 1016 for acquiring a fifth function by applying a Fourier transform to the fourth function, (6) means 1018 for acquiring a sixth function by multiplying the fifth function by inverse function of the spectrum distribution of the distribution of the original information, (7) means 1020 for acquiring a seventh function by applying an inverse Fourier transform to the sixth function, (8) means 1022 for acquiring a next estimated distribution of the impulse response by multiplying the estimated distribution of the impulse response by the seventh function, means 1024 for replacing the estimated distribution of the impulse response by the next estimated distribution of the impulse response, and repeating to cause the means (1) to (8) to execute processes thereof, and means 1026 for applying a Fourier transform to the estimated distribution of the impulse response to acquire and output the distribution of the frequency response of the transfer system.

The degraded information restoration method can be preferably carried out by the following device. FIGS. 9, 10, and 11 exemplify functional block diagrams of a device 1100 according to the present invention. The device 1100 according to the present invention is a device which restores degraded information to original information. This device 1100 includes means 1102 for identifying a distribution of the degraded information, means 1104 for identifying an initial estimated distribution of the original information, means 1106 for identifying an initial estimated distribution of an impulse response of a transfer system, (A) means 1108 for updating the estimated distribution of the impulse response based on the distribution of the degraded information, the estimated distribution of the original information, and the estimated distribution of the impulse response, (B) means 1110 for updating the estimated distribution of the original information based on the distribution of the degraded information, the estimated distribution of the original information, and the estimated distribution of the impulse response, means 1112 for alternately repeating to cause the means (A) and (B) to execute processes thereof, and means 1114 for outputting the restored original information based on the estimated distribution of the original information.

FIG. 10 exemplifies a functional block diagram of the (A) means 1108 for updating the estimated distribution of the impulse response. The (A) means 1108 for updating the estimated distribution of the impulse response includes (A1) means 1116 for acquiring a spectrum distribution of the estimated distribution of the original information by applying a Fourier transform to the estimated distribution of the original information, (A2) means 1118 for acquiring a first function by applying a Fourier transform to the estimated distribution of the impulse response, (A3) means 1120 for acquiring a second function by multiplying the first function by the spectrum distribution of the estimated distribution of the original information, (A4) means 1122 for acquiring a third function by applying an inverse Fourier transform to the second function, (A5) means 1124 for acquiring a fourth function by dividing the distribution of the degraded information by the third function, (A6) means 1126 for acquiring a fifth function by applying a Fourier transform to the fourth function, (A7) means 1128 for acquiring a sixth function by multiplying the fifth function by an inverse function of the spectrum distribution of the estimated distribution of the original information, (A8) means 1130 for acquiring a seventh function by applying an inverse Fourier transform to the sixth function, (A9) means 1132 for acquiring a next estimated distribution of the impulse response by multiplying the estimated distribution of the impulse response by the seventh function, and (A10) means 1132 for replacing the estimated distribution of the impulse response by the next estimated distribution of the impulse response.

FIG. 11 exemplifies a functional block diagram of the (B) means 1110 for updating the estimated distribution of the original information. The (B) means 1110 for updating the estimated distribution of the original information includes (B1) means 1134 for acquiring an estimated distribution of a frequency response of the transfer system by applying a Fourier transform to the estimated distribution of the impulse response, (B2) means 1136 for acquiring a first function by applying a Fourier transform to the estimated distribution of the original information, (B3) means 1138 for acquiring a second function by multiplying the first function by the estimated distribution of the frequency response, (B4) means 1140 for acquiring a third function by applying an inverse Fourier transform to the second function, (B5) means 1142 for acquiring a fourth function by dividing the distribution of the degraded information by the third function, (B6) means 1144 for acquiring a fifth function by applying a Fourier transform to the fourth function, (B7) means 1146 for acquiring a sixth function by multiplying the fifth function by an inverse function of the estimated distribution of the frequency response, (B8) means 1148 for acquiring a seventh function by applying an inverse Fourier transform to the sixth function, (B9) means 1150 for acquiring a next estimated distribution of the original information by multiplying the estimated distribution of the original information by the seventh function, and (B10) means 1150 for replacing the estimated distribution of the original information by the next estimated distribution of the original information.

As shown in FIGS. 10 and 11, in the device 1100 for restoring degraded information, the (A) means 1108 for updating the estimated distribution of the impulse response preferably includes means 1152 for repeating the means (A2) to (A10) thereby causing the execution of the processes thereof, and the (B) means 1110 for updating the estimated distribution of the original information preferably includes means 1154 for repeating the means (B2) to (B10) thereby causing the execution of the processes thereof.

Effects of the Invention

According to the method, program, and device for estimating a frequency response, each being of the present invention, it is possible to estimate a frequency response of a transfer system based on a distribution of the degraded information and a distribution of the original information. According to the above technology, even if the distribution of the original information does not include specific frequency bands, it is possible to obtain a frequency response for all frequencies.

Moreover, according to the method, program, and device for restoring degraded information to original information, each being of the present invention, it is possible to estimate a frequency response and to perform a restoration to determine the original information based only on the distribution of the degraded information.

The above method, program, and device can be applied to visualizations on the nanometer level of structures in the dynamic state including biological macromolecules such as peptides and proteins, and an image analysis in the field of astronomy.

EXPLANATION OF REFERENCE NUMERALS

Figure 1:
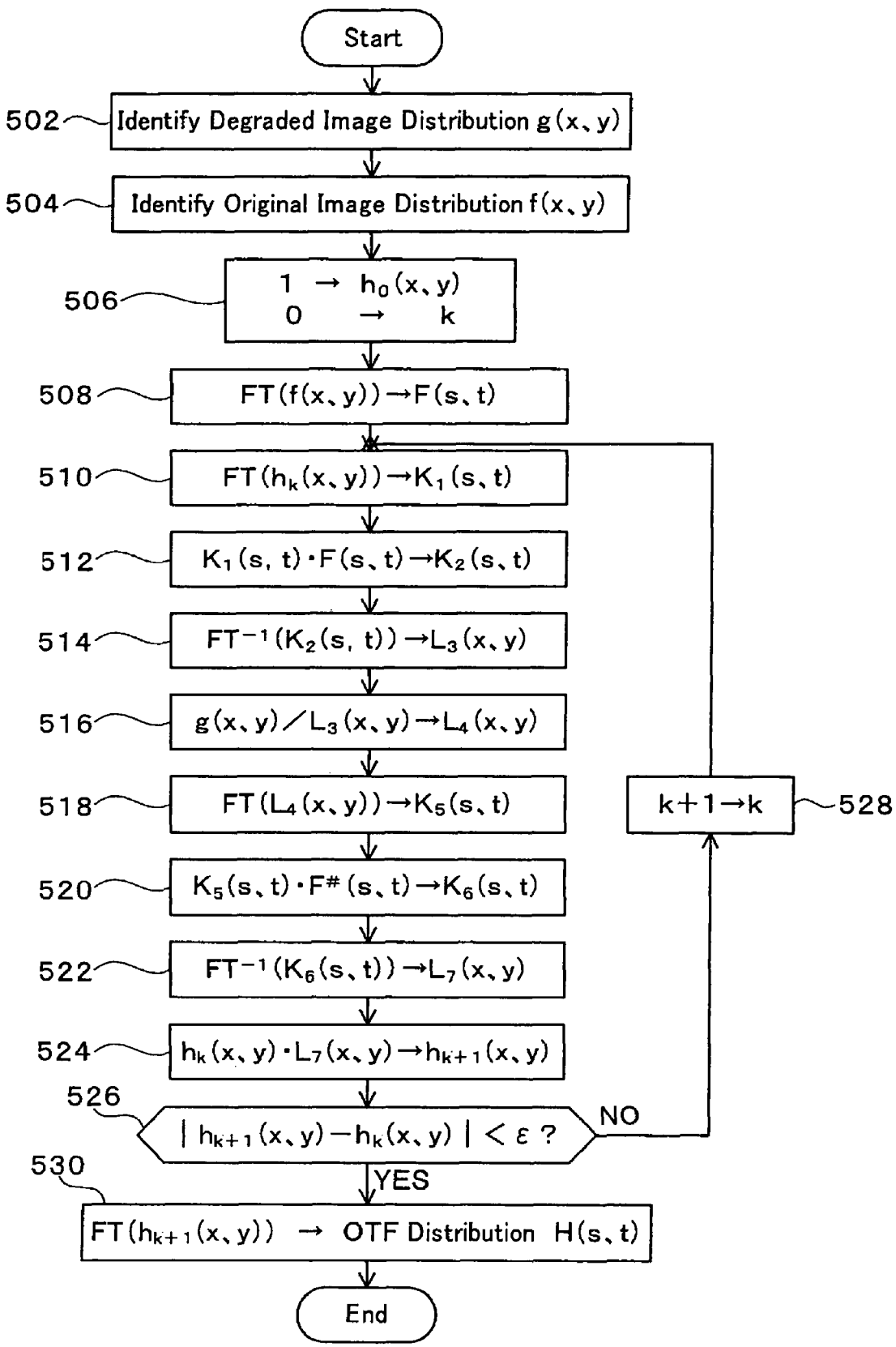
FIG. 1 is a flowchart of the method according to a first embodiment of the present invention.

10 . . . original image
12 . . . optical system
14 . . . degraded image
52 . . . estimated distribution of the real part of the PSF (number of iterations: twice)
54 . . . estimated distribution of the real part of the PSF (number of iterations: 50 times)
56 . . . estimated distribution of the real part of the PSF (number of iterations: 250 times)
62 . . . estimated distribution of the original image
64 . . . estimated distribution of the real part of the PSF
502, 504, 506, 508, 510, 512, 514, 516, 518, 520, 522, 524, 526, 528, 530 . . . respective steps of the method according to a first embodiment
602, 604, 606, 608, 610, 612, 614, 616 . . . respective steps of a method according to a second embodiment
702, 704, 706, 708, 710, 712, 714, 716, 718, 720, 722, 724, 726 . . . respective steps of an estimation of the OTF
802, 804, 806, 808, 810, 812, 814, 816, 818, 820, 822, 824 . . . respective steps of an estimation of the original image
1000 . . . estimating device for the distribution of a frequency response
1002, 1004, 1006, 1008, 1010, 1012, 1014, 1016, 1018, 1020, 1022, 1024, 1026 . . . respective means constituting an estimating device for the distribution of a frequency response
1100 . . . restoring device for degraded information
1102, 1104, 1106, 1108, 1110, 1112, 1114, 1116, 1118, 1120, 1122, 1124, 1126, 1128, 1130, 1132, 1134, 1136, 1138, 1140, 1142, 1144, 1146, 1148, 1150, 1152, 1154 . . . respective means constituting a restoring device for degraded information

BEST MODE FOR CARRYING OUT THE INVENTION

A description will now be given of embodiments of the present invention with reference to drawings.

EMBODIMENTS

First Embodiment

A description will now be given of a method according to a present embodiment with reference to drawings. FIG. 1 is a flowchart describing the method according to the present embodiment.

Figure 7:
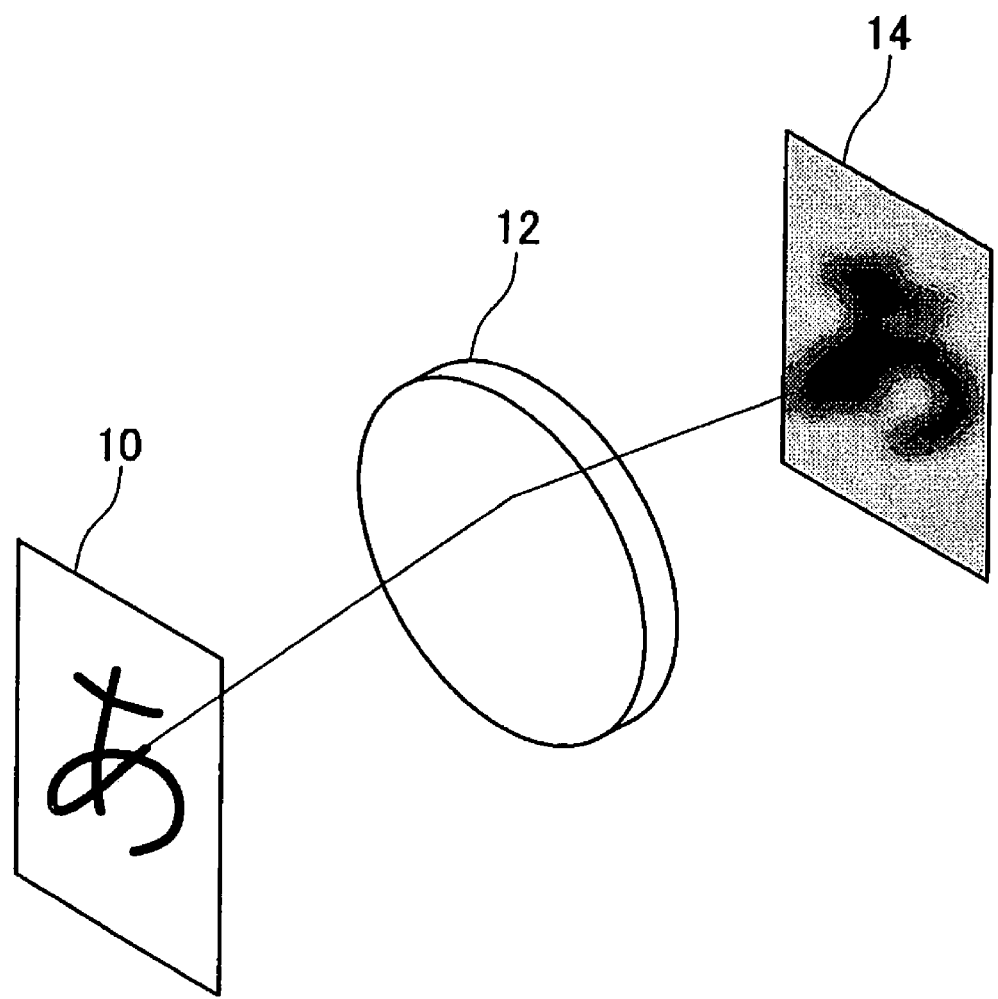
FIG. 7 schematically shows a transfer from an original image to a degraded image via an optical system.
Figure 8:
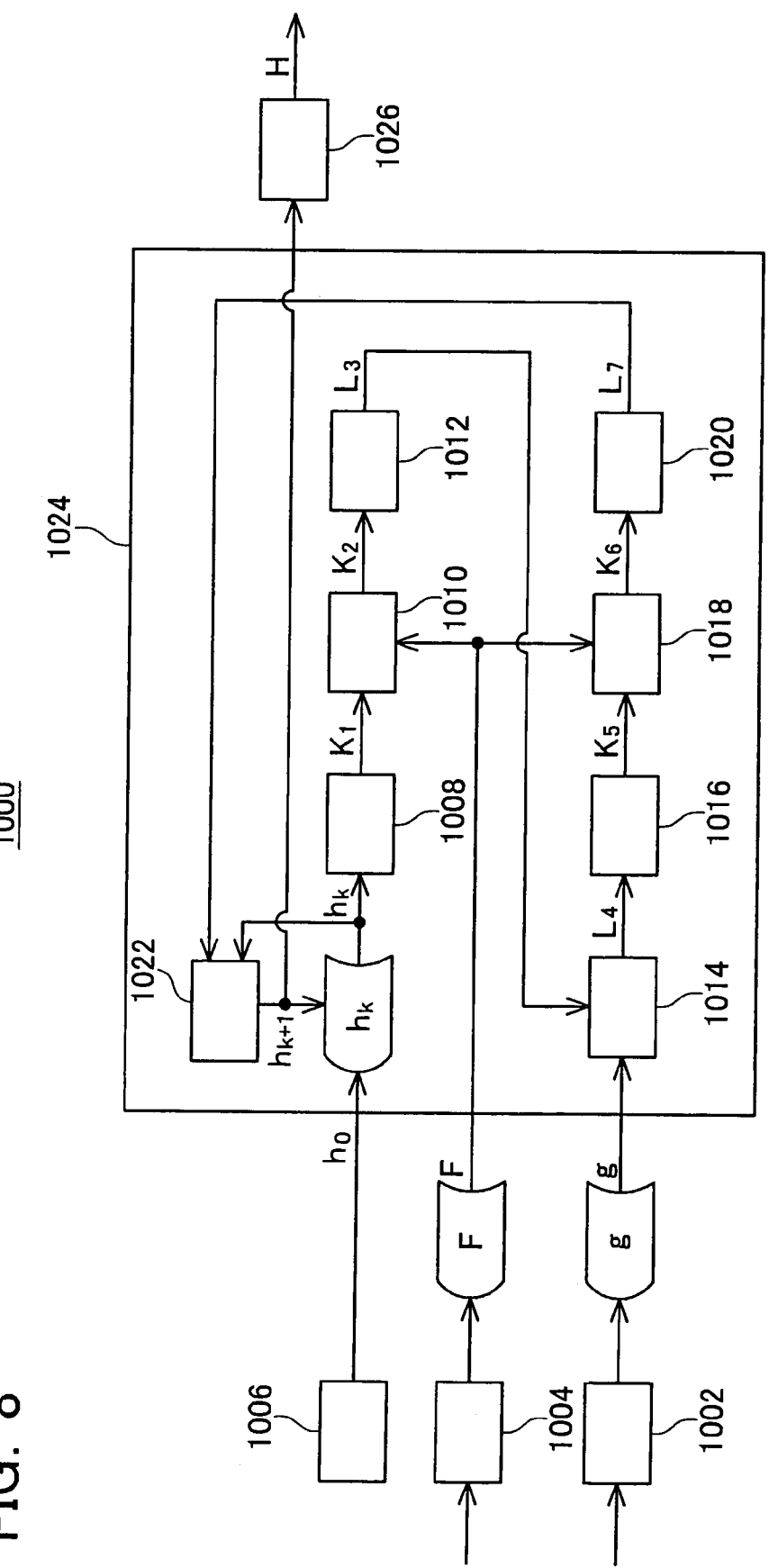
FIG. 8 is a functional block diagram of an estimating device 1000 for the distribution of a frequency response according to the present invention.
Figure 9:
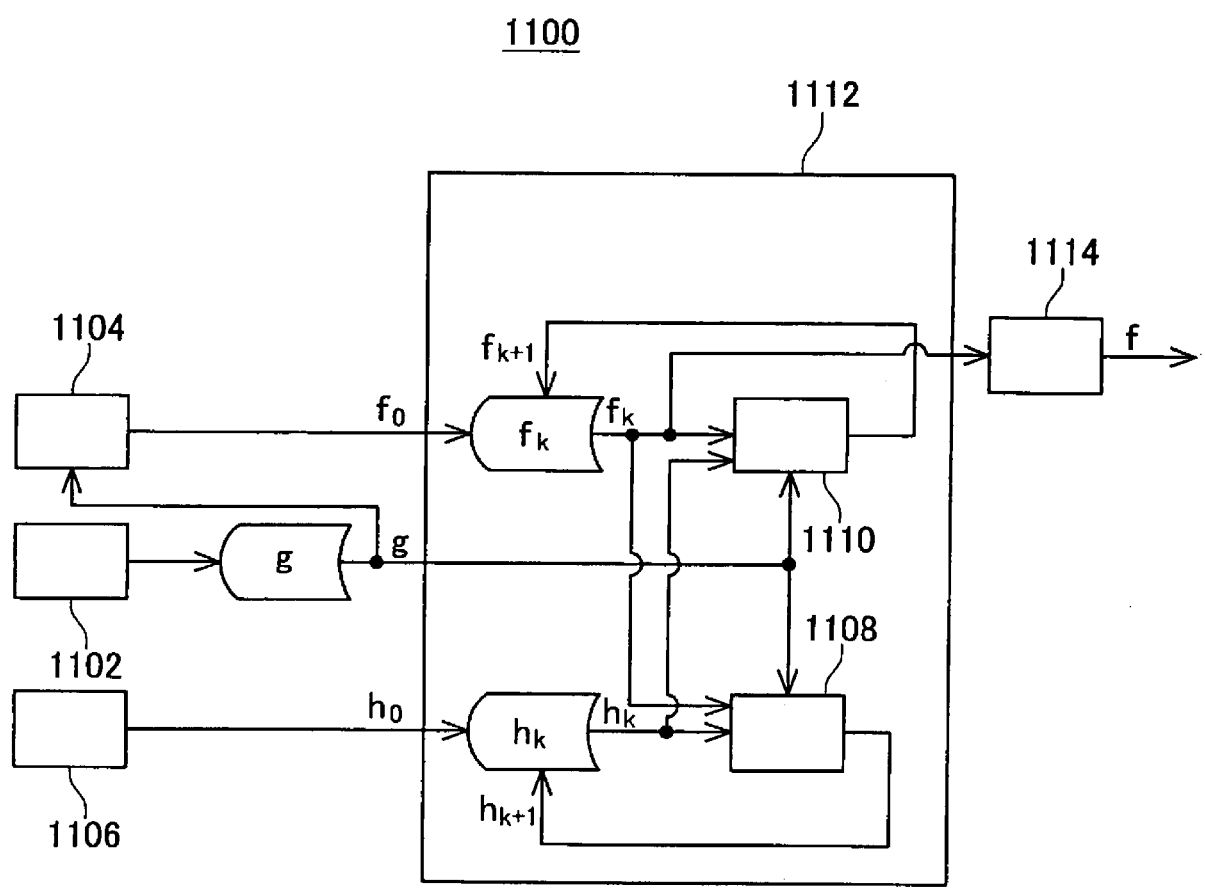
FIG. 9 is a functional block diagram of a restoring device 1100 for degraded information according to the present invention.
Figure 10:
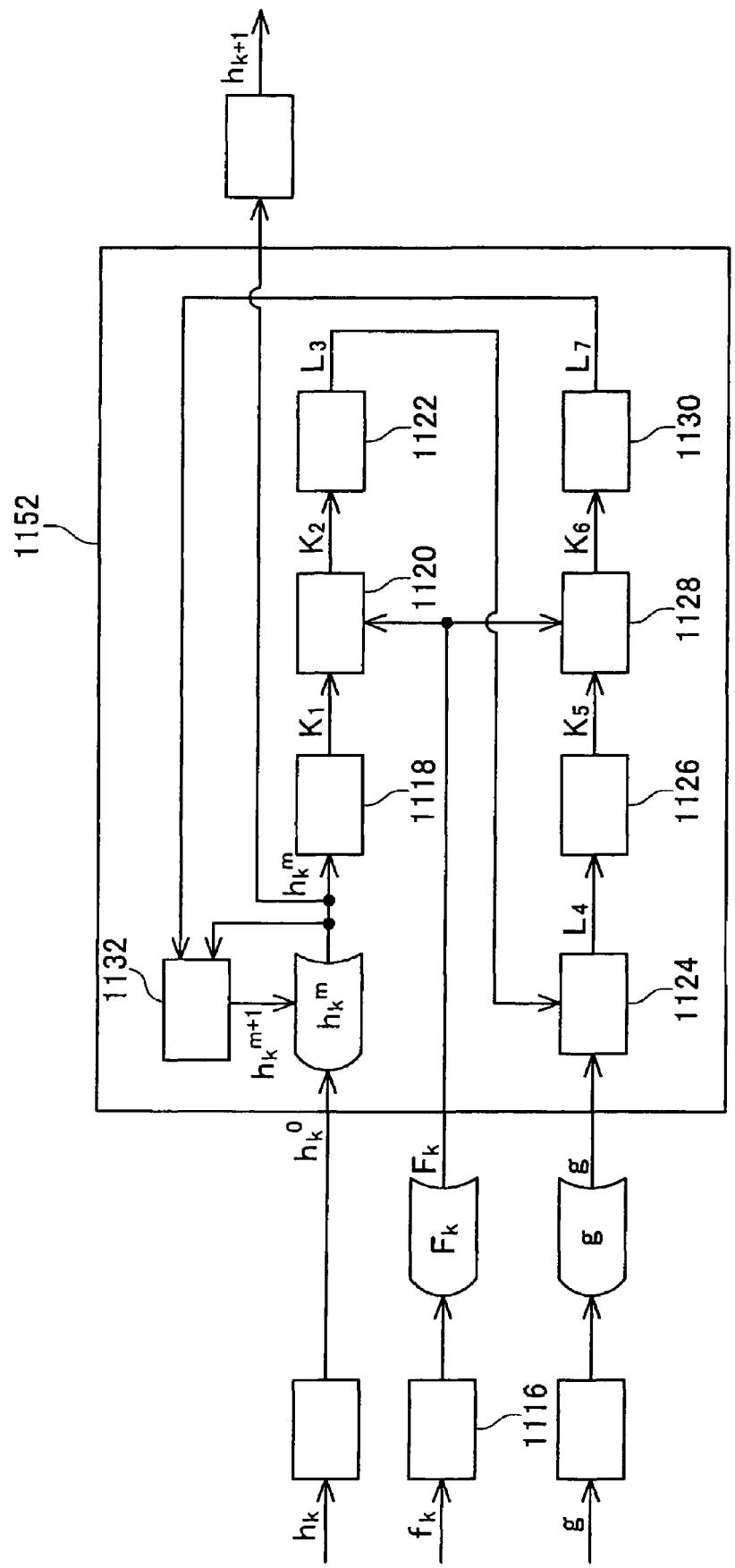
FIG. 10 is a functional block diagram of (A) means 1108 for updating the estimated distribution of an impulse response of the restoring device 1100.
Figure 11:
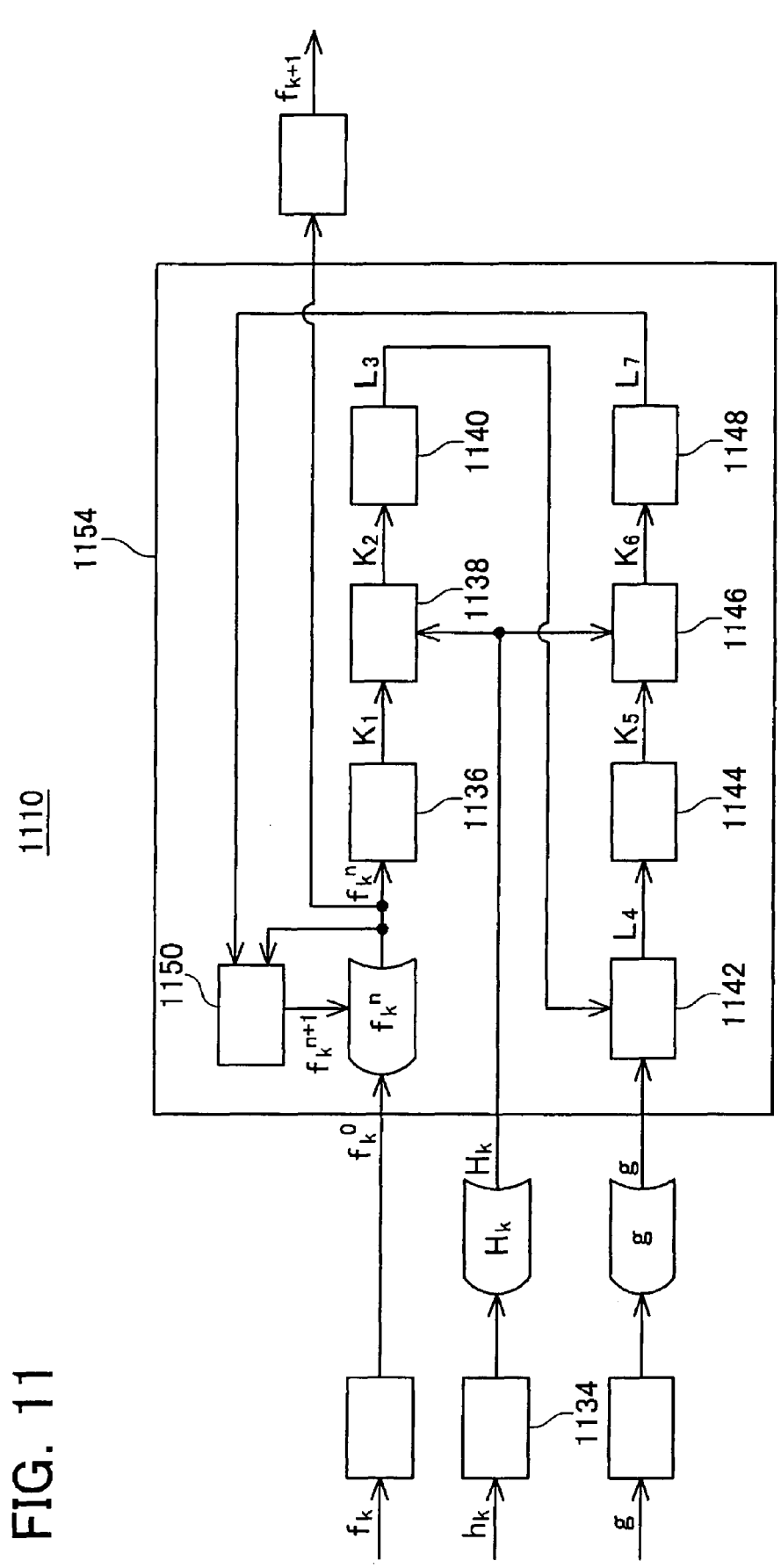
FIG. 11 is a functional block diagram of (B) means 1110 for updating the estimated distribution of the original information of the restoring device 1110.
Figure 12:
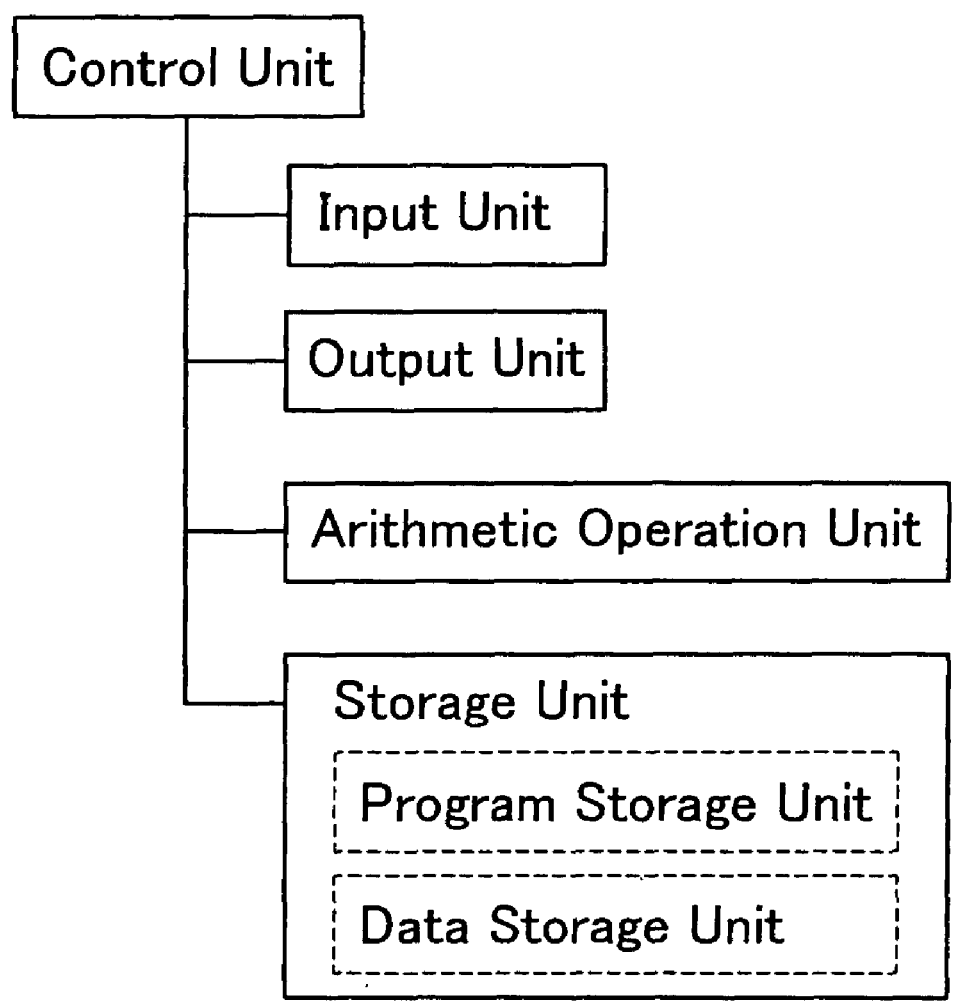
FIG. 12 shows an example of a hardware configuration of a computer.

The present embodiment employs a method for estimating an OTF of an optical system 12 based on an original image 10 and a degraded image 14 when the black and white original image 10 becomes the black and white degraded image 14 as a result of a transfer through the optical system 12 as shown in FIG. 7. In the above case, the method according to the present embodiment estimates the OTF of the optical system 12 by means of an iterative calculation using the black and white original image 10 and the black and white degraded image 14. The original image 10 and the degraded image 14 are the same in size, and a position on the images can be represented as (x,y).

According to the present embodiment, a distribution $f(x,y)$ describing the original image 10, a distribution $g(x,y)$ describing the degraded image 14, and a distribution $h_k(x,y)$ (k=0, 1, 2, . . . ) of the PSF estimated in the process of the iterative calculation are treated as complex functions in order to take into account the phase characteristic of each of the respective distributions. According to the present embodiment, the real part of the distribution g(x,y) is a distribution of the illuminance for the degraded image, and the real part of the distribution f(x,y) is a distribution of the illuminance for the original image.

First, in the step 502, the distribution g(x,y) of the degraded image is identified. According to the present embodiment, since the phase characteristic of the distribution g(x,y) is not known, the real part of the distribution g(x,y) is the distribution of the illuminance for the degraded image, and the imaginary part of the distribution g(x,y) is 0 (zero) everywhere.

In the step 504, the distribution f(x,y) for the original image is identified. According to the present embodiment, since the phase characteristic of the distribution f(x,y) is not known, the real part of the distribution f(x,y) is the distribution of the illuminance for the original image, and the imaginary part of the distribution f(x,y) is 0 (zero) everywhere.

In the step 506, the initial estimated distribution $h_0(x,y)$ of the PSF of the optical system 12 is set. The initial estimated distribution $h_0(x,y)$ of the PSF may be set to an arbitrary distribution. According to the method of the present embodiment, the initial estimated distribution $h_0(x,y)$ is set to 1 for all the coordinates (x,y). Moreover, the count k of the iterative calculation is set to 0 (zero) in the step 506.

In the step 508, the distribution f(x,y) of the original image is transformed by applying a Fourier transform, and a result thereof is set to a function F(s,t). Variables s and t respectively denote spatial frequencies in the x and y directions. This Fourier transform is carried out in terms of the spatial frequency on a two-dimensional plane, and is defined by the following equation.

[Equation 30]

$$F(s,t)=FT(f(x,y))(s,t)=\int_{-\infty}^{\infty}\int_{-\infty}^{\infty}f(x,y)e^{j(sx+ty)}dxdy \quad (30)$$

FT( ) in the above equation and in FIG. 1 denotes a two-dimensional Fourier transform. This Fourier transform can preferably carried out by means of a fast Fourier transform. The function F(s,t) obtained as described above represents a spatial spectrum of the distribution f(x,y) of the original image.

In the step 510, the estimated distribution $h_k(x,y)$ of the PSF is transformed by applying a Fourier transform, and a result thereof is set to a function $K_1(s,t)$. The function $K_1(s,t)$ corresponds to a first function. k is a non-negative integer, and is incremented in a subsequent step 526 according to the number of the iterations of the iterative calculation.

In the step 512, a function $K_2(s,t)$ is calculated by multiplying the function $K_1(s,t)$ calculated in the step 510 by the spectrum distribution F(s,t) of the original image calculated in the step 508. The function $K_2(s,t)$ corresponds to the second function.

In the step 514, the function $K_2(s,t)$ calculated in the step 512 is transformed by applying an inverse Fourier transform, and a result thereof is set to a function $L_3(x,y)$. The function $L_3(x,y)$ corresponds to the third function. This inverse Fourier transform is used to calculate a distribution in real space from a spectrum relating to the spatial frequency on a two-dimensional plane, and is defined by the following equation.

[Equation 31]

$$L_3(x,y)=FT^{-1}(K_2(s,t))(x,y)=\int_{-\infty}^{\infty}\int_{-\infty}^{\infty}K_2(s,t)e^{-j(sx+ty)}dsdt \quad (31)$$

$FT^{-1}$( ) in the above equation and in FIG. 1 denotes a two-dimensional inverse Fourier transform.

In the step 516, a function $L_4(x,y)$ is calculated by dividing the distribution g(x,y) of the degraded image identified in the step 502 by the function $L_3(x,y)$ calculated in the step 514. The function $L_4(x,y)$ corresponds to the fourth function.

In the step 518, the function $L_4(x,y)$ calculated in the step 516 is transformed by applying a Fourier transform, and a result thereof is set to a function $K_5(s,t)$. The function $K_5(s,t)$ corresponds to the fifth function.

In the step 520, a function $K_6(s,t)$ is calculated by multiplying the function $K_5(s,t)$ calculated in the step 518 by a function $F^\#(s,t)$. The function $K_6(s,t)$ corresponds to the sixth function. The function $F^\#(s,t)$ denotes an inverse function of the spectrum distribution F(s,t) of the original image calculated in the step 508, and therefore $F^\#(s,t)=F(-s,-t)$ holds.

In the step 522, the function $K_6(s,t)$ calculated in the step 520 is transformed by applying an inverse Fourier transform, and a result thereof is set to a function $L_7(x,y)$. The function $L_7(x,y)$ corresponds to the seventh function.

In the step 524, the improved estimated distribution $h_{k+1}(x,y)$ of the PSF is calculated by multiplying the estimated distribution $h_k(x,y)$ of the PSF by the function $L_7(x,y)$ calculated in the step 522. The function $L_7$ is generally a complex function including an imaginary part, and it is thus possible to improve the estimated distribution of the PSF including the phase characteristic according to the above method.

In the step 526, the difference between the improved estimated distribution $h_{k+1}(x,y)$ of the PSF and the estimated distribution $h_k(x,y)$ of the PSF is calculated, and it is determined whether the absolute value of the difference is less than a certain threshold $\epsilon$ for all the coordinates (x,y). If the absolute value of the difference is greater than or equal to the threshold $\epsilon$ for a certain coordinate (x,y) ("NO" in the step 526), it is determined that the improved estimated distribution $h_{k+1}(x,y)$ of the PSF has not converged, and the process proceeds to a step 528. If the absolute value of the difference is less than the threshold $\epsilon$ for all the coordinates (x,y) ("YES" in the step 526), it is determined that the improved estimated distribution $h_{k+1}(x,y)$ of the PSF has converged, and the process proceeds to a step 530.

In the step 528, the count k for the iterative calculation is incremented by one. The process proceeds to the step 510, and the process from the step 510 to the step 524 is carried out again.

In the step 530, the estimated distribution $h_{k+1}(x,y)$ of the PSF obtained as a result of the iterative calculation is transformed by applying a Fourier transform in order to calculate the estimated distribution H(s,t) of the optical system 12.

The estimated distribution H(s,t) calculated by the above method may be shown on a display, may be printed onto a sheet by a printing device, may be stored in a storage device such as a hard disk, or may be transferred to another computer via a communication line.

Figure 5:
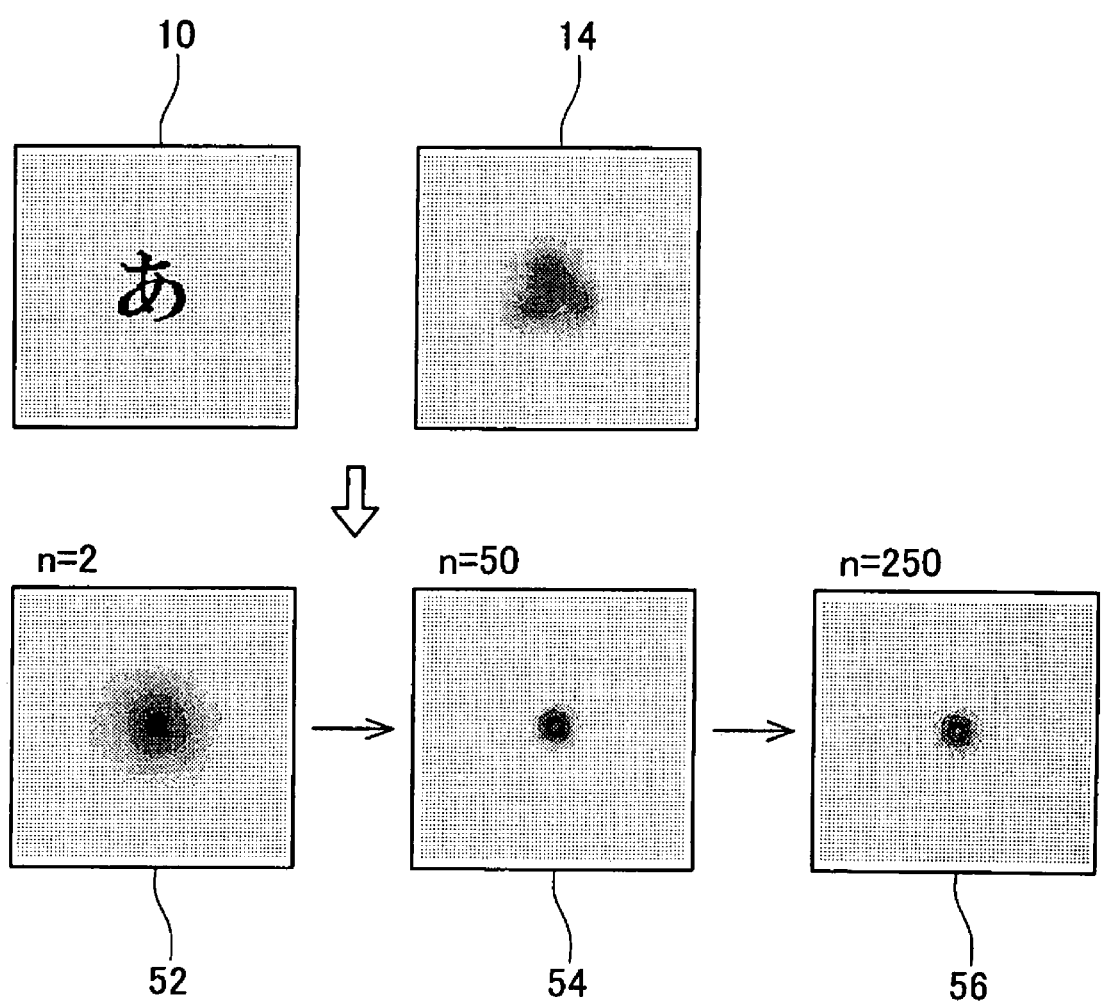
FIG. 5 shows an overview of the method according to the first embodiment of the present invention.

FIG. 5 shows how a distribution of an OTF of an optical system is estimated based on a degraded image 14 and an original image 10 according to the above method. FIG. 5 shows the real part of a distribution of a PSF corresponding to the estimated distribution of the OTF. An estimated distribution 52 of the PSF shows the result after the iterative calculation is repeated twice, an estimated distribution 54 of the PSF shows the result after the iterative calculation is repeated 50 times, and an estimated distribution 56 of the PSF shows the result after the iterative calculation is repeated 250 times. The estimated distribution of the PSF converges as the number of iterations of the iterative calculation increases. In other words, the estimated distribution of the OTF converges.

Second Embodiment

A description will now be given of another embodiment according to the present invention with reference to drawings.

The present embodiment performs a restoration to an original image 10 and estimates an OTF of an optical system 12 based only on a degraded image 14 when the black and white original image 10 becomes the black and white degraded image 14 as a result of a transfer through the optical system 12 as shown in FIG. 7. In the above case, the method of the present embodiment assumes proper distributions both for the distribution of the original image and the distribution of the OTF. An improved distribution of the OTF of the optical system 12 is then estimated by means of an iterative calculation using the assumed distribution of the original image and the distribution of the degraded image. An improved distribution of the original image is then estimated by means of an iterative calculation using the estimated distribution of the OTF and the distribution of the degraded image. An iterative calculation is then carried out using the improved distribution of the original image and the distribution of the degraded image, and a further improved distribution of the OTF is estimated in turn. As described above, the estimation of the distribution of the original image and the estimation of the distribution of the OTF are alternately repeated, and the estimated distribution of the original image and the estimated distribution of the OTF are finally obtained according to the Bayes' theorem.

The original image 10 and the degraded image 14 are the same in size, and a position on the images can be represented as (x,y).

According to the present embodiment, all the distributions comprising distribution g(x,y) describing the degraded image 14, distributions $f_k(x,y)$ and $f_k''(x,y)$ describing the original image 10 estimated in the process of the iterative calculation, and distributions $h_k(x,y)$ and $h_k'''(x,y)$ of the PSF estimated in the process of the iterative calculation, are treated as complex functions in order to take into account the phase characteristic of each of them respectively. According to the present embodiment, the real part of the distribution g(x,y) is a distribution of the illuminance for the degraded image, and the real part of both the distributions $f_k(x,y)$ and $f_k''(x,y)$ is an estimated distribution of the illuminance for the original image.

Figure 2:
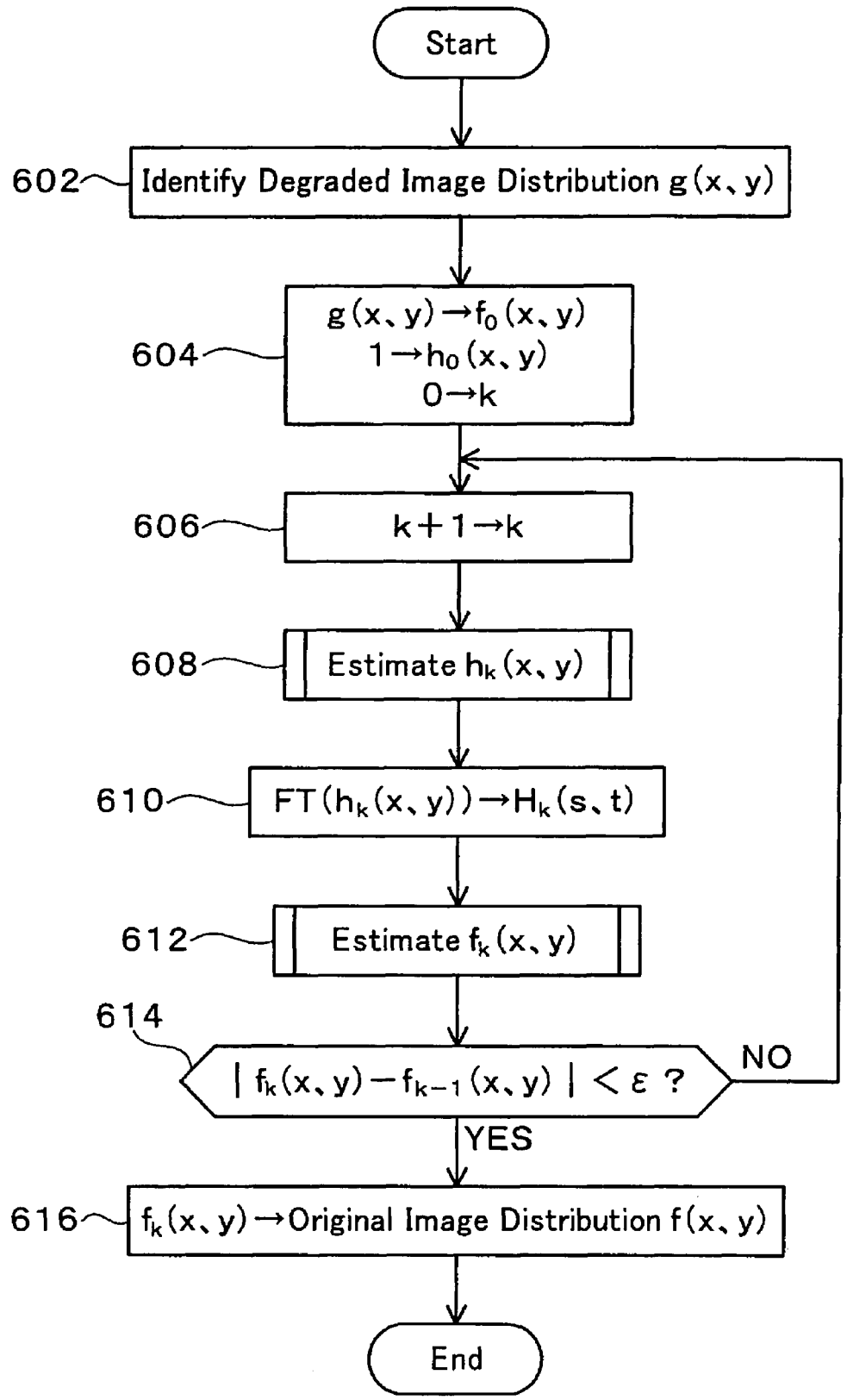
FIG. 2 is a flowchart of the method according to a second embodiment of the present invention.

FIG. 2 shows a flowchart of an image restoration method according to the present embodiment.

In the step 602, the distribution g(x,y) of the degraded image is identified. According to the method of the present embodiment, the real part of the distribution g(x,y) is the distribution of the illuminance distribution for the degraded image, and the imaginary part of the distribution g(x,y) is 0 (zero) everywhere.

In the step 604, the initial estimated distribution $f_0(x,y)$ of the original image is set. As the initial estimated distribution $f_0(x,y)$ of the original image, an arbitrary distribution may be set. According to the method of the present embodiment, the distribution g(x,y) of the degraded image is used as the initial estimated distribution $f_0(x,y)$ of the original image. It is generally considered that the distribution of an original image and the distribution of a degraded image are not largely different from each other, and it is thus possible to reduce the number of iterations of the iterative calculation used in the process of the restoration to the original image by setting the initial estimated distribution $f_0(x,y)$ of the original image as described above.

Moreover, in the step 604, the initial estimated distribution $h_0(x,y)$ of the PSF is set. As the initial estimated distribution $h_0(x,y)$ of the PSF, an arbitrary distribution may be set. According to the method of the present embodiment, a function whose real part and imaginary part are respectively 1 and 0 for all coordinates (x,y) is used as the initial estimated distribution $h_0(x,y)$ of the PSF.

Furthermore, in the step 604, the count k of the iterative calculation is set to 0 (zero).

In the step 606, the count k of the iterative calculation is incremented by one.

In the step 608, the estimated distribution $h_k(x,y)$ of the PSF is calculated. This calculation will be described later.

In the step 610, the estimated distribution $h_k(x,y)$ of the PSF is transformed by applying a Fourier transform to obtain the estimated distribution $H_k(s,t)$ of the OTF.

In the step 612, the estimated distribution $f_k(x,y)$ of the original image is calculated. This calculation will be described later.

In the step 614, the difference between the estimated distribution $f_k(x,y)$ of the original image updated in the step 612 and the estimated distribution $f_{k-1}(x,y)$ of the original image before the update is calculated, and it is determined whether the difference is lower than a certain threshold $\epsilon$ for all the coordinates (x,y). If the difference is greater than or equal to the threshold $\epsilon$ for a certain coordinate (x,y) ("NO" in the step 614), it is determined that the estimated distribution $f_k(x,y)$ of the original image has not converged, and the process proceeds to a step 606, and the process from the step 606 to the step 612 is carried out again. If the difference is less than the threshold $\epsilon$ for all the coordinates (x,y) ("YES" in the step 614), it is determined that the estimated distribution $f_k(x,y)$ of the original image has converged, and the process proceeds to a step 616.

In the step 616, the estimated distribution $f_k(x,y)$ obtained as a result of the iterative calculation is set to the distribution f(x,y) of the restored original image. Since the method according to the present embodiment treats the distributions describing the images as the complex functions during the process of the iterative calculation, the distribution f(x,y) of the original image is generally set as a complex function. According to the method of the present embodiment, the real part of the distribution f(x,y) of the restored original image represents a distribution of the illuminance for the original image.

The distribution f(x,y) calculated by the above method may be shown on a display, may be printed onto a sheet by a printing device, may be stored in a storage device such as a hard disk, or may be transferred to another computer via a communication line.

Figure 3:
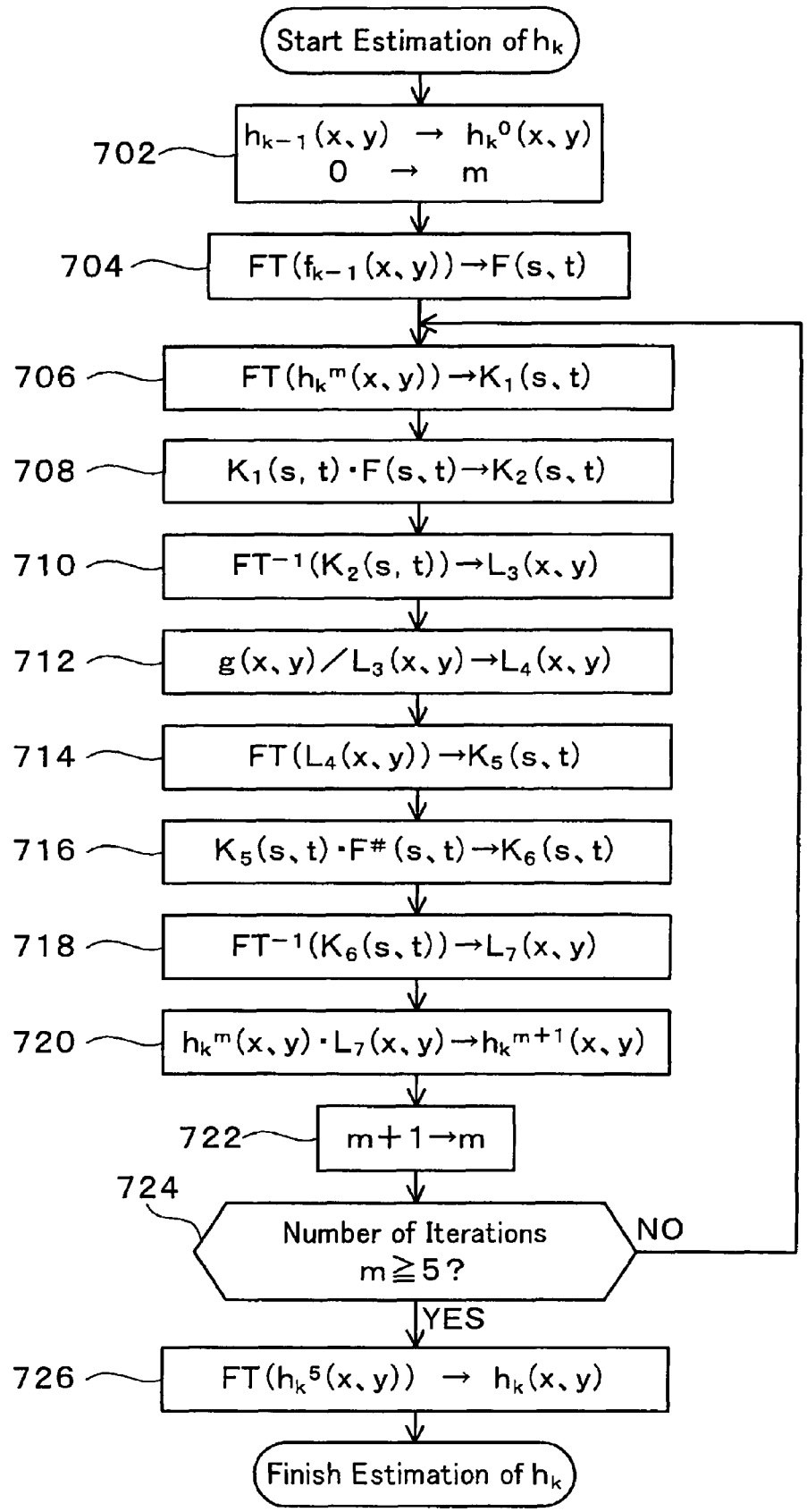
FIG. 3 is a flowchart of the process for estimating a PSF by means of the method according to the second embodiment of the present invention.

A detailed description will be given of the estimation of the distribution $h_k(x,y)$ in the step 608 in the following section. In the method according to the present embodiment, steps 702 to 726 shown in a flowchart of FIG. 3 are carried out to estimate the distribution $h_k(x,y)$.

In the step 702, the initial estimated distribution $h_k^0(x,y)$ of the distribution $h_k(x,y)$ is set. According to the method of the present embodiment, the distribution $h_{k-1}(x,y)$, which has already been obtained, is set to the initial estimated distribution $h_k^0(x,y)$ of the distribution $h_k(x,y)$. Moreover, in the step 702, a count m of the iterative calculation for the estimation of the distribution $h_k(x,y)$ is set to 0.

In the step 704, the estimated distribution F(s,t) of the spectrum of the original image is set. According to the method of the present embodiment, the estimated distribution $f_{k-1}(x,y)$ of the original image is transformed by applying a Fourier transform, and a result thereof is set to the spectrum distribution F(s,t).

In the step 706, the estimated distribution $h_k^m(x,y)$ of the distribution $h_k(x,y)$ is transformed by applying a Fourier transform, and a result thereof is set to a function $K_1(s,t)$. The function $K_1(s,t)$ corresponds to the first function.

In the step 708, a function $K_2(s,t)$ is calculated by multiplying the function $K_1(s,t)$ calculated in the step 706 by the estimated distribution $F(s,t)$ of the spectrum of the original image calculated in the step 704. The function $K_2(s,t)$ corresponds to the second function.

In the step 710, the function $K_2(s,t)$ calculated in the step 708 is transformed by applying an inverse Fourier transform, and a result thereof is set to a function $L_3(x,y)$. The function $L_3(x,y)$ corresponds to the third function.

In the step 712, a function $L_4(x,y)$ is calculated by dividing the distribution $g(x,y)$ of the degraded image identified in the step 604 in FIG. 2 by the function $L_3(x,y)$ calculated in the step 710 in FIG. 3. The function $L_4(x,y)$ corresponds to the fourth function.

In the step 714, the function $L_4(x,y)$ calculated in the step 712 is transformed by applying a Fourier transform, and a result thereof is set to a function $K_5(s,t)$. The function $K_5(s,t)$ corresponds to the fifth function.

In the step 716, a function $K_6(s,t)$ is calculated by multiplying the function $K_5(s,t)$ calculated in the step 714 by a function $F^\#(s,t)$. The function $K_6(s,t)$ corresponds to the sixth function. The function $F^\#(s,t)$ denotes an inverse function of the estimated distribution $F(s,t)$ of the spectrum of the original image calculated in the step 704, and therefore $F^\#(s,t)=F(-s,-t)$ holds.

In the step 718, the function $K_6(s,t)$ calculated in the step 716 is transformed by applying an inverse Fourier transform, and a result thereof is set to a function $L_7(x,y)$. The function $L_7(x,y)$ corresponds to the seventh function.

In the step 720, the estimated distribution $h_k^m(x,y)$ of the distribution $h_k(x,y)$ is multiplied by the function $L_7(x,y)$ set in the step 718, and the result thereof is set to an improved estimated distribution $h_k^{m+1}(x,y)$ of the distribution $h_k(x,y)$.

In the step 722, the count m for the iterative calculation for the estimation of the distribution $h_k(x,y)$ is incremented by one.

In the step 724, it is determined whether the count m for the iterative calculation for the estimation of the distribution $h_k(x,y)$ is greater than or equal to a threshold. According to the present embodiment, the number of the iterations of the iterative calculation for the estimation of the distribution $h_k(x,y)$ is 5. If the count m of the number of iterations is less than 5 ("NO" in the step 724), the process proceeds to the step 706, and the process from the step 706 to the step 722 is carried out again. If the count m of the number of the iterations is greater than or equal to 5 ("YES" in the step 724), the process proceeds to the step 726.

In the step 726, the distribution $h_k^5(x,y)$ obtained as a result of the above iterative calculation is set to the estimated distribution of the distribution $h_k(x,y)$.

The above iterative calculation corresponds to the estimation of the distribution $h_k(x,y)$ of the PSF based on the distribution $g(x,y)$ of the degraded image and the distribution $f_{k-1}(x,y)$ of the original image. The closer the distribution $f_{k-1}(x,y)$ of the original image is to the true distribution $f(x,y)$ of the original image, the closer the distribution $h_k(x,y)$ estimated by the above iterative calculation is to the true distribution $h(x,y)$ of the PSF.

Figure 4:
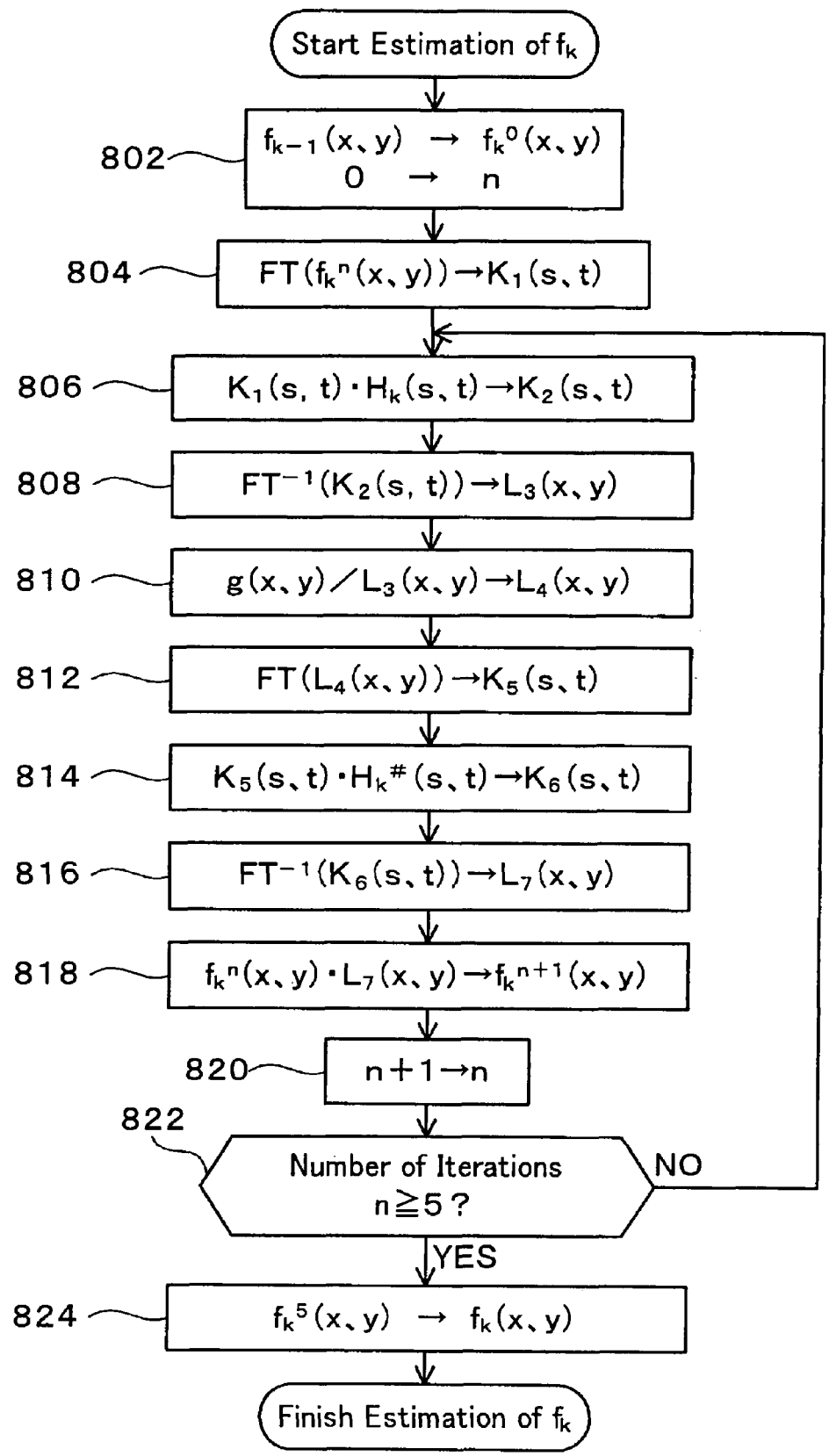
FIG. 4 is a flowchart of the process for estimating an original image by means of the method according to the second embodiment of the present invention.

A detailed description will be given of the estimation of the distribution $f_k(x,y)$ in the step 612 in FIG. 2 in the following section. In the method according to the present embodiment, steps 802 to 824 shown in a flowchart of FIG. 4 are carried out to estimate the distribution $f_k(x,y)$.

In the step 802, an initial estimated distribution $f_k^0(x,y)$ of the distribution $f_k(x,y)$ is set. According to the present embodiment, the distribution $f_{k-1}(x,y)$, which has already been obtained, is set to the initial estimated distribution $f_k^0(x,y)$ of the distribution $f_k(x,y)$. Moreover, in the step 802, a count n of the iterative calculation for the estimation of the distribution $f_k(x,y)$ is set to 0.

In the step 804, the estimated distribution $f_k^n(x,y)$ of the distribution $f_k(x,y)$ is transformed by applying a Fourier transform, and a result thereof is set to a function $K_1(s,t)$. The function $K_1(s,t)$ corresponds to the first function.

In the step 806, a function $K_2(s,t)$ is calculated by multiplying the function $K_1(s,t)$ calculated in the step 804 by the estimated distribution $H_k(s,t)$ of the OTF calculated in the step 610 in FIG. 2. The function $K_2(s,t)$ corresponds to the second function.

In the step 808, the function $K_2(s,t)$ calculated in the step 806 is transformed by applying an inverse Fourier transform, and a result thereof is set to a function $L_3(x,y)$. The function $L_3(x,y)$ corresponds to the third function.

In the step 810, a function $L_4(x,y)$ is calculated by dividing the distribution $g(x,y)$ of the degraded image identified in the step 602 in FIG. 2 by the function $L_3(x,y)$ calculated in the step 808. The function $L_4(x,y)$ corresponds to the fourth function.

In the step 812, the function $L_4(x,y)$ calculated in the step 810 is transformed by applying a Fourier transform, and a result thereof is set to a function $K_5(s,t)$. The function $K_5(s,t)$ corresponds to the fifth function.

In the step 814, the function $K_6(s,t)$ is calculated by multiplying the function $K_5(s,t)$ calculated in the step 812 by a function $H_k^\#(s,t)$. The function $H_k^\#(s,t)$ denotes an inverse function of the estimated distribution $H_k(s,t)$ of the OTF calculated in the step 610 in FIG. 2, and therefore $H_k^\#(s,t)=H_k(-s,-t)$ holds.

In the step 816, the function $K_6(s,t)$ calculated in the step 814 is transformed by applying an inverse Fourier transform, and a result thereof is set to a function $L_7(x,y)$. The function $L_7(x,y)$ corresponds to the seventh function.

In the step 818, an improved estimated distribution $f_k^{n+1}(x,y)$ of the distribution $f_k(x,y)$ is calculated by multiplying the estimated distribution $f_k^n(x,y)$ of the distribution $f_k(x,y)$ by the function $L_7(x,y)$ set in the step 816.

In the step 820, the count n of the iterative calculation for the estimation of distribution $f_k(x,y)$ is incremented by 1.

In the step 822, it is determined whether the count n for the iterative calculation for the estimation of the distribution $f_k(x,y)$ is greater than or equal to a threshold. According to the present embodiment, the number of the iterations of the iterative calculation for the estimation of the distribution $f_k(x,y)$ is 5. If the count n of the number of iterations is less than 5 ("NO" in the step 822), the process proceeds to the step 804, and the process from the step 804 to the step 820 is carried out again. If the count n of the number of the iterations is greater than or equal to 5 ("YES" in the step 822), the process proceeds to the step 824.

In the step 824, the distribution $f_k^5(x,y)$ obtained as a result of the above iterative calculation is set to the estimated distribution of the distribution $f_k(x,y)$.

The above iterative calculation corresponds to the estimation of the distribution $f_k(x,y)$ of the original image based on the distribution $g(x,y)$ of the degraded image and the distribution $H_k(s,t)$ of the OTF. The closer the distribution $H_k(s,t)$ of the OTF is to the true distribution $H(s,t)$ of the OTF, the closer the distribution $f_k(x,y)$ estimated by the above iterative calculation is to the true distribution $f(x,y)$ of the original image.

Figure 6:
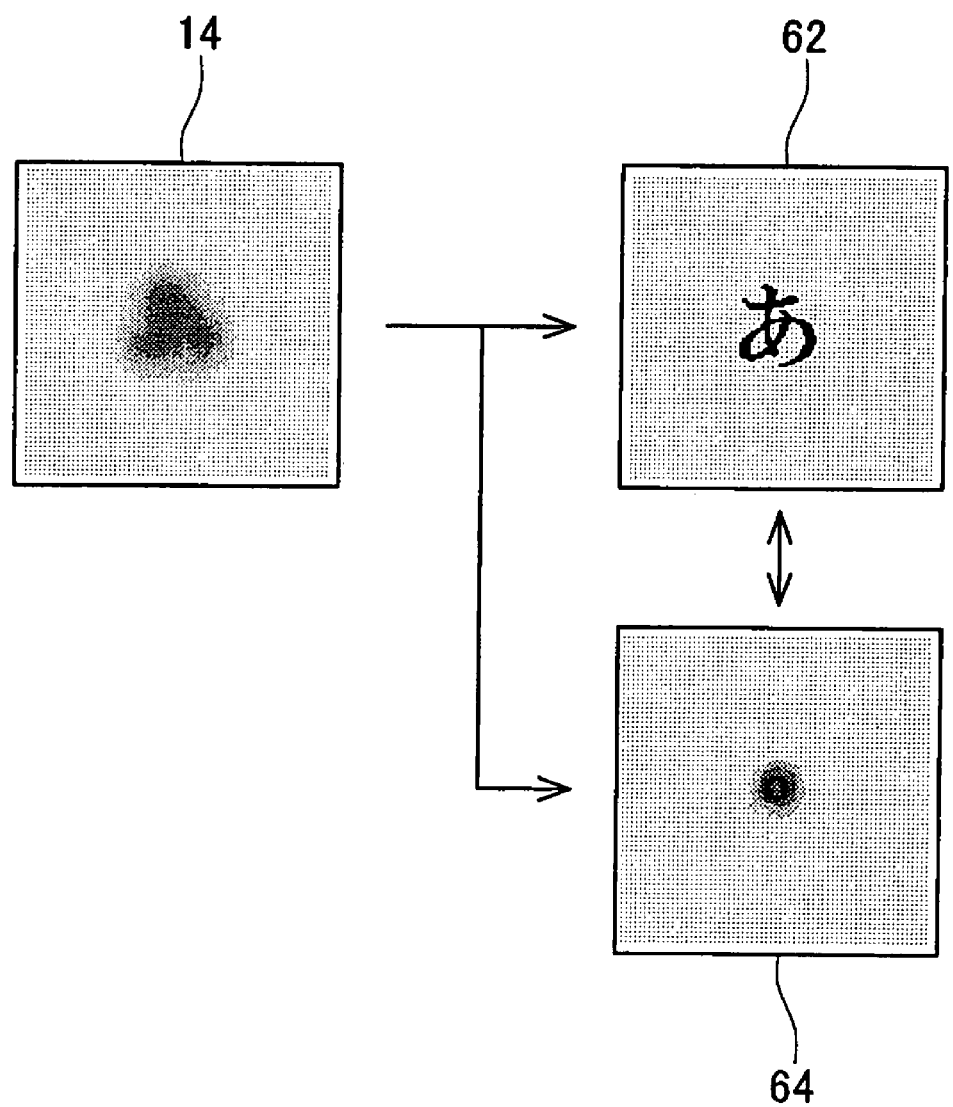
FIG. 6 shows an overview of the method according to the second embodiment of the present invention.

FIG. 6 shows a result of a restoration to an original image 62 by means of the iterative calculation based only on a degraded image 14 according to the above method. A character, whose borders are vague and which is hardly recognizable on the degraded image 14, is clearly recognizable as a character on the restored original image 62. Moreover, FIG. 6 shows a distribution 64 of the real part of the PSF corresponding to the OTF of an optical system 12 estimated in parallel with the restoration to the original image 62.

Though the description given in the above embodiment is of a restoration to the black and white original image, a similar method can be used to perform restoration to an original image including colors. If an original image includes colors, distributions fr(x,y), fg(x,y), and fb(x,y) of the illuminance of the respective color components R, G, B in the original image can be individually estimated according to the method of the embodiment based on distributions gr(x,y), gg(x,y), and gb(x,y) of the illuminance of the respective color components R, G, B of a degraded image. For example, the distribution fr(x,y) of the illuminance of the color component R in the original image can be estimated by means of the iterative calculation using the distribution gr(x,y) of the illuminance of the color component R in the degraded image. Similarly, the distribution fg(x,y) of the illuminance of the color component G and the distribution fb(x,y) of the illuminance of the color component B in the original image can be estimated. It is possible to perform restoration to the original image from the estimated illuminance distributions of the R, G, and B components in the original image.

For the above embodiments, the description given is of an example in which the estimated distribution of the OTF is updated first, and then the estimated distribution of the original image is updated in the process of the iterative calculation. Since it is necessary to alternately repeat the update of the estimated distribution of the OTF and the update of the estimated distribution of the original image, the estimated distribution of the original image may be updated first, and the estimated distribution of the OTF may then be updated.

Though a detailed description has been given of the embodiments of the present invention, they are simply examples, and are not intended to limit the scope of the claims. The technologies described in the claims include variations and modifications to the exemplified embodiments in various manners.

The technical elements described herein and in the drawings provide technical usefulness solely or in combination, and are not limited to the combinations described in the claims of the application. Moreover, the technologies exemplified herein and the drawings attain multiple objectives simultaneously, and the technologies can be said to have technical utility if the achieve at least one of those objectives.

The invention claimed is:

1. A method for estimating a distribution of a frequency response of a transfer system based on original information and degraded information obtained as a result of transfer of the original information in the transfer system, the frequency response including a phase characteristic of the transfer system, the method performed by a computer including a storage unit and a control unit, and comprising:
   identifying, with the control unit, a distribution of the degraded information represented by a complex probability density function;
   acquiring, with the control unit, a spectrum distribution of a distribution of the original information by applying a Fourier transform to the distribution of the original information which is represented by a complex probability density function;
   identifying, with the control unit, an initial estimated distribution of an impulse response of the transfer system, the impulse response is the probability density function representing the distribution of the degraded information when the distribution of the original information is represented by a unit impulse function;
   (1) acquiring, with the control unit, a first function by applying a Fourier transform to the estimated distribution of the impulse response;
   (2) acquiring, with the control unit, a second function by multiplying the first function by the spectrum distribution of the distribution of the original information;
   (3) acquiring, with the control unit, a third function by applying an inverse Fourier transform to the second function;
   (4) acquiring, with the control unit, a fourth function by dividing the distribution of the degraded information by the third function;
   (5) acquiring, with the control unit, a fifth function by applying a Fourier transform to the fourth function;
   (6) acquiring, with the control unit, a sixth function by multiplying the fifth function by a phase-reverse function of the spectrum distribution of the distribution of the original information;
   (7) acquiring, with the control unit, a seventh function by applying an inverse Fourier transform to the sixth function;
   (8) acquiring, with the control unit, a next estimated distribution of the impulse response by multiplying the estimated distribution of the impulse response by the seventh function;
   replacing, with the control unit, the estimated distribution of the impulse response by the next estimated distribution of the impulse response, and repeating said steps (1) to (8); and
   applying, with the control unit, a Fourier transform to the estimated distribution of the impulse response to acquire and output the distribution of the frequency response of the transfer system.

2. A non-transitory computer readable medium storing a program for causing a computer to execute the respective steps of the method according to claim 1.

3. The method according to claim 1, wherein
   the complex probability density function representing the distribution of the degraded information includes a real part and an imaginary part, the imaginary part representing a phase characteristic of the degraded information and being zero,
   the complex probability density function representing the distribution of the original information includes a real part and an imaginary part, the imaginary part representing a phase characteristic of the original information and being zero, the seventh function being a complex function including an imaginary part, and
   the next estimated distribution of the impulse response including the phase characteristic of the transfer system.

4. A device for estimating a distribution of a frequency response of a transfer system based on original information and degraded information obtained as a result of transfer of the original information in the transfer system, the frequency response including a phase characteristic of the transfer system, comprising:
   a storage unit; and
   a control unit, the control unit including:
   means for identifying a distribution of the degraded information represented by a complex probability density function;
   means for acquiring a spectrum distribution of a distribution of the original information by applying a Fourier transform to the distribution of the original information which is represented by a complex probability density function;

means for identifying an initial estimated distribution of an impulse response of the transfer system, the impulse response is the probability density function representing the distribution of the degraded information when the distribution of the original information is represented by a unit impulse function;

(1) means for acquiring a first function by applying a Fourier transform to the estimated distribution of the impulse response;

(2) means for acquiring a second function by multiplying the first function by the spectrum distribution of the distribution of the original information;

(3) means for acquiring a third function by applying an inverse Fourier transform to the second function;

(4) means for acquiring a fourth function by dividing the distribution of the degraded information by the third function;

(5) means for acquiring a fifth function by applying a Fourier transform to the fourth function;

(6) means for acquiring a sixth function by multiplying the fifth function by a phase-reverse function of the spectrum distribution of the distribution of the original information, (7) means for acquiring a seventh function by applying an inverse Fourier transform to the sixth function;

(8) means for acquiring a next estimated distribution of the impulse response by multiplying the estimated distribution of the impulse response by the seventh function;

means for replacing the estimated distribution of the impulse response by the next estimated distribution of the impulse response, and causing said means (1) to (8) to repeatedly execute processes thereof; and means for applying a Fourier transform to the estimated distribution of the impulse response to acquire and output the distribution of the frequency response of the transfer system.

* * * * *